US012777329B2

(12) United States Patent
Hawkes et al.

(10) Patent No.: US 12,777,329 B2
(45) Date of Patent: Oct. 27, 2026

(54) VARIABLE AUTHENTICATION IDENTIFIER (AID) FOR ACCESS POINT (AP) PRIVACY

(71) Applicant: QUALCOMM Incorporated, San Diego, CA (US)

(72) Inventors: Philip Michael Hawkes, Valley Heights (AU); Sai Yiu Duncan Ho, San Diego, CA (US); Jouni Kalevi Malinen, Tuusula (FI); Soo Bum Lee, San Diego, CA (US); George Cherian, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/483,041

(22) Filed: Sep. 23, 2021

(65) Prior Publication Data

US 2023/0087211 A1 Mar. 23, 2023

(51) Int. Cl.

| | |
|---|---|
| ***H04W 12/06*** | (2021.01) |
| ***H04W 12/03*** | (2021.01) |
| ***H04W 12/0431*** | (2021.01) |
| ***H04W 12/73*** | (2021.01) |

(52) U.S. Cl.
CPC ........... *H04W 12/06* (2013.01); *H04W 12/03* (2021.01); *H04W 12/0431* (2021.01); *H04W 12/73* (2021.01)

(58) Field of Classification Search
CPC . H04W 12/06; H04W 12/03; H04W 12/0431; H04W 12/73
See application file for complete search history.

(56) References Cited

U.S. PATENT DOCUMENTS

| | | | | |
|---|---|---|---|---|
| 7,684,563 | B1 | 3/2010 | Olson et al. | |
| 10,057,813 | B1 * | 8/2018 | Likar | H04L 63/0846 |
| 10,129,499 | B1 | 11/2018 | Boone | |
| 11,405,789 | B1 * | 8/2022 | Wei | H04W 60/00 |
| 2004/0068653 | A1 * | 4/2004 | Fascenda | H04W 12/50 713/168 |

(Continued)

FOREIGN PATENT DOCUMENTS

| | | |
|---|---|---|
| CN | 102685741 B | 12/2014 |
| WO | WO-2014113882 A1 | 7/2014 |

*Primary Examiner* — Ali S Abyaneh
*Assistant Examiner* — Lydia L Noel
(74) *Attorney, Agent, or Firm* — Holland & Hart LLP/Qualcomm

(57) ABSTRACT

This disclosure provides methods, devices and systems for using a variable authentication identifier (AID) for access point (AP) privacy. For example, instead of a persistent SSID, an AID is used by a station (STA) to authenticate the AP before connecting to the AP. The AP is associated with a service set, and the STA has stored a secret token associated with the service set. Before connecting to the AP, a broadcasted probe request from the STA includes no identifying information other than the token. The AP generates the AID from the token and provides the AID in a probe response. The STA is able to identify the AP as being associated with a service set and connect to the AP using the token and AID without the token and the AID being used by another device not associated with the service set to identify the AP.

30 Claims, 13 Drawing Sheets

(56) References Cited

U.S. PATENT DOCUMENTS

| | | | | |
|---|---|---|---|---|
| 2007/0019609 | A1* | 1/2007 | Anjum | H04L 63/0414 370/349 |
| 2014/0298020 | A1* | 10/2014 | Yamagishi | H04L 45/42 713/168 |
| 2014/0337633 | A1* | 11/2014 | Yang | H04W 12/06 713/178 |
| 2016/0029215 | A1* | 1/2016 | Jung | H04W 12/02 713/168 |
| 2016/0055697 | A1 | 2/2016 | Raina et al. | |
| 2016/0249276 | A1 | 8/2016 | Sun et al. | |
| 2017/0012977 | A1* | 1/2017 | Li | H04L 63/06 |
| 2017/0289159 | A1* | 10/2017 | Adrangi | H04W 12/06 |
| 2019/0268847 | A1* | 8/2019 | Asterjadhi | H04W 52/0216 |
| 2020/0059784 | A1 | 2/2020 | Batra et al. | |
| 2021/0185028 | A1* | 6/2021 | Bailey | H04L 9/0891 |
| 2021/0345112 | A1* | 11/2021 | Elliott | H04W 12/08 |
| 2022/0368670 | A1 | 11/2022 | Lumbatis | |
| 2023/0043950 | A1* | 2/2023 | Wang | H04W 12/03 |
| 2023/0098093 | A1 | 3/2023 | Hawkes et al. | |

* cited by examiner

VARIABLE AUTHENTICATION IDENTIFIER (AID) FOR ACCESS POINT (AP) PRIVACY

TECHNICAL FIELD

This disclosure relates generally to wireless communication, and more specifically, to use of a variable authentication identifier (AID) for access point (AP) privacy.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. The wireless communication device includes a processing system and an interface. The interface is configured to obtain a probe request from a station (STA). The probe request includes a token. The interface also is configured to provide a probe response. The probe response includes a variable authentication identifier (AID) associated with authenticating the wireless communication device as belonging to a service set, and the variable AID is associated with the token.

Another innovative aspect of the subject matter described in this disclosure can be implemented in a method for wireless communication. The method includes receiving a probe request from a STA. The probe request including a token. The method also includes transmitting a probe response. The probe response includes a variable AID associated with authenticating the wireless communication device as belonging to a service set, and the variable AID is associated with the token.

Another innovative aspect of the subject matter described in this disclosure can be implemented in a wireless communication device. The wireless communication device includes a processing system and an interface. The interface is configured to provide a probe request to an access point (AP). The probe request includes a token, and the token is associated with a service set. The interface also is configured to obtain a probe response from the AP. The probe response includes a variable AID associated with authenticating the AP as belonging to a service set, and the variable AID is associated with the token.

Another innovative aspect of the subject matter described in this disclosure can be implemented in a method for wireless communication. The method includes transmitting a probe request to an AP. The probe request includes a token, and the token is associated with a service set. The method also includes receiving a probe response from the AP. The probe response includes a variable AID associated with authenticating the AP as belonging to a service set, and the variable AID is associated with the token.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

BRIEF DESCRIPTION OF THE DRAWINGS

Like reference numbers and designations in the various drawings indicate like elements.

DETAILED DESCRIPTION

Figure 1:
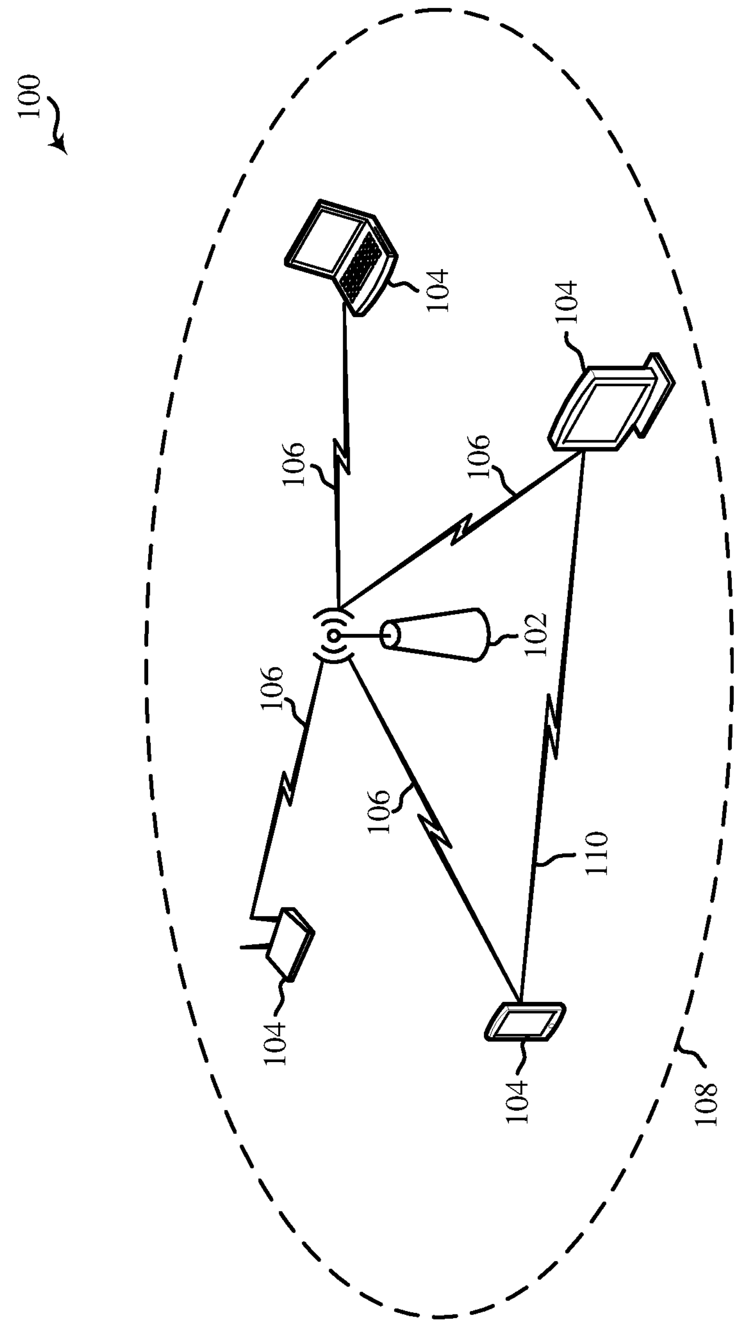
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Device privacy may be a concern for access points (APs) of a WLAN in some scenarios. In one example scenario, a user device may be used as a software enabled access point (also referred to as a "soft AP" or "SAP") for other devices to connect to the Internet via the user device's Internet connection or to connect together to create a private local area network (LAN) of devices. In another example scenario, a courier service, a taxi service, or other network of vehicles may include an access point (AP) in each vehicle, with each AP connecting to a network across the entire service. A user may desire for an AP to remain private to prevent others from tracking the device or otherwise maliciously inserting themselves into the wireless traffic with the AP. To assist in keeping a STA and an AP private, a STA and an AP may be configured to use a temporary identifier instead of a persistent MAC address assigned to the device for wireless communications between a STA and an AP. The temporary identifier may be converted to a persistent MAC address at the STA or the AP. Using a temporary identifier instead of a MAC address allows a STA to conceal its identity from other devices snooping packets transmitted by the STA. Using a temporary identifier instead of a MAC address also may allow an AP to conceal a BSSID. However, an AP still may be identified and tracked by an SSID included in packets transmitted by the AP. Each AP is associated with a service set identifier (SSID) that can be used to identify the AP. Typically, an AP is configured to broadcast beacons including the SSID for the AP. A user may attempt to keep an AP private by configuring the AP not to broadcast beacons. As such, another device cannot track an AP by passively scanning for beacons including the SSID for the AP. However, a device can track the AP by performing active scanning or snooping packets from active scanning. During active scanning, the device transmits a probe request, and the AP is configured to transmit a probe response including the SSID to the device after receiving the probe request. Another party may use a device to track an AP by snooping probe requests from another device and the probe responses from the AP. In tracking an AP, another party may determine the location of the AP or other personal information that the user may wish to keep private. In addition, the SSID typically is used by the STA for selecting an AP to which to connect and for identifying which credentials to use in security processes with the AP. As such, there is a need for a mechanism to replace the SSID with an identifier recognized by both the STA and the AP but which is not recognizable to other devices not associated with the service set. As such, there is a need to improve the privacy of an AP while not interfering with a STA's ability to connect to the AP in certain scenarios.

Various aspects relate generally to the use of a variable authentication identifier (AID) instead of an SSID to allow an AP to remain private and not be identified by other devices while still being used by the STA to connect to the AP. Some aspects more specifically relate to using a variable identifier for a device to authenticate an AP for connecting to the AP. The variable identifier is used in place of the SSID associated with the AP. In some implementations, an AP obtains a probe request from a station (STA). Instead of the probe request including the SSID associated with the AP, the probe request includes a token. The AP provides a probe response including a variable AID (instead of an SSID) associated with authenticating the AP as belonging to a service set (such as a basic service set (BSS) or an extended service set (ESS)), and the variable AID is associated with the token. The AP is able to decipher from the token that the STA previously was associated with the service set or was previously provisioned to associate with the service set, and the STA is able to decipher from the variable AID that the AP is part of the service set without another party being able to track the AP or the STA. The variable AID and the token may be based on a secret key stored at both the AP and the STA, and the variable AID changes between probe responses in what appears to be a random manner. Regarding the AID, a STA is configured to use a variable AID (instead of a persistent SSID) to authenticate an AP with a service set. Authenticating an AP may include determining that the AP is part of the service set associated with an SSID and that the STA is to connect to the AP. Using a variable AID instead of a persistent SSID in wireless communications allows an AP to remain private without being snooped. Similarly, a variable AID may be used instead of a static AID also to prevent snooping. If the same identifier is used for multiple wireless communications, the identifier may be learned by a device snooping multiple packets from the AP or by a device replaying a same packet including the identifier. A variable AID instead of a static AID is used to prevent the same identifier from being used over time to protect the privacy of the AP. Generating the variable AID may be based on a secret token and key shared between a STA and the AP, and the STA may decipher from the variable AID that the AP is part of the service set associated with the SSID. Some example implementations of using a variable AID or generating a variable AID by a wireless communication device are described herein. While the examples described herein are with reference to a wireless communication device for a WLAN, aspects of the present disclosure may be used for other types of wireless networks, such as a WWAN or a WPAN.

Particular aspects of the subject matter described in this disclosure can be implemented to realize one or more of the following potential advantages. In some examples, the described techniques may prevent other devices from being used to track the AP by snooping probe requests and probe responses or by transmitting probe requests including an SSID for the AP. As such, an AP may be kept private while allowing STAs previously provided with a token of the service set to identify the AP as being associated with the service set. By keeping the AP private, sensitive information, such as the location of the AP or other information regarding the AP, may be obscured from snooping devices. The described techniques also allow for the provisioning of tokens that are unique to each STA, and the tokens may be revoked on a per-STA basis. As such, if a specific STA's ability to identify APs as being associated with the service set is to cease, the APs of the service set may be informed that the tokens provided to the STA are no longer valid for use in identifying APs as being associated with the service set (while other tokens issued to other STAs may continue to be valid for use).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. A STA 104 may be a user device, and the STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples. An AP 102 may include an infrastructure AP or a software enabled AP (SAP). An AP 102 as an infrastructure AP may represent access points for a defined coverage area, such as for a home, an office, or a place of business. An AP 102 as an SAP may represent a user device (such as a mobile phone, personal digital assistant (PDA), another handheld device, netbook, notebook computer, tablet computer, laptop, among other examples) executing software to enable the device temporarily to act as an AP for one or more STAs.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (ASID) to the STA 104 at the culmination of the association operations, which the AP 102 uses to track the STA 104.

Multiple APs 102, with each AP 102 associated with a BSS, together may form an extended service set (ESS) including multiple connected BSSs. As a result of the increasing ubiquity of wireless networks, a STA 104 may have the opportunity to select one of many BSSs within range of the STA or to select among the multiple APs 102 that together form an ESS including multiple connected BSSs. As used herein, a service set may refer to a BSS or an ESS. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
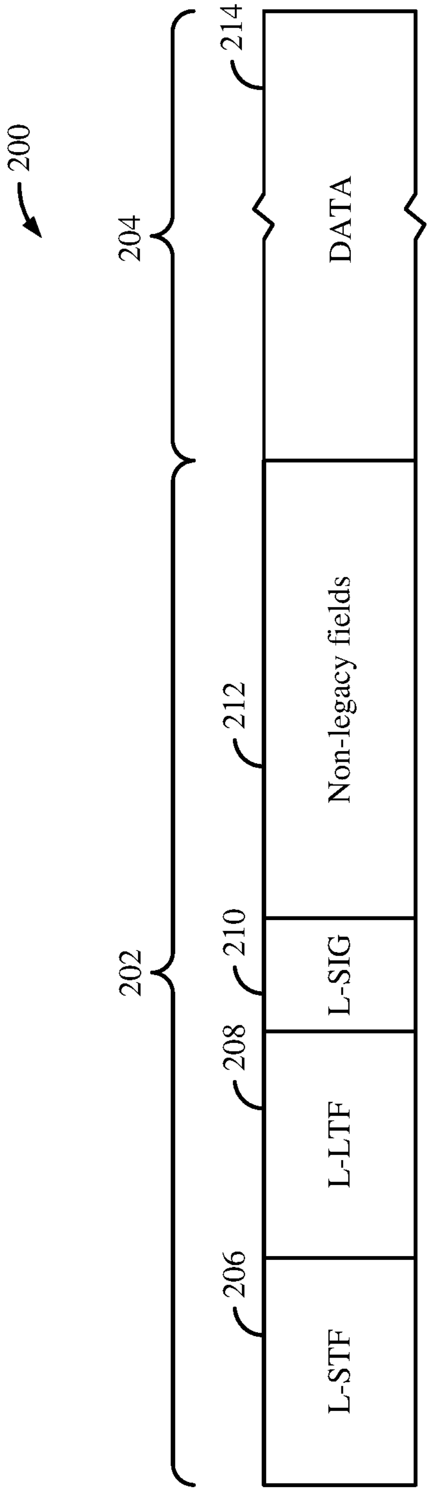
FIG. 2A shows an example protocol data unit (PDU) usable for communications between an access point (AP) and one or more stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
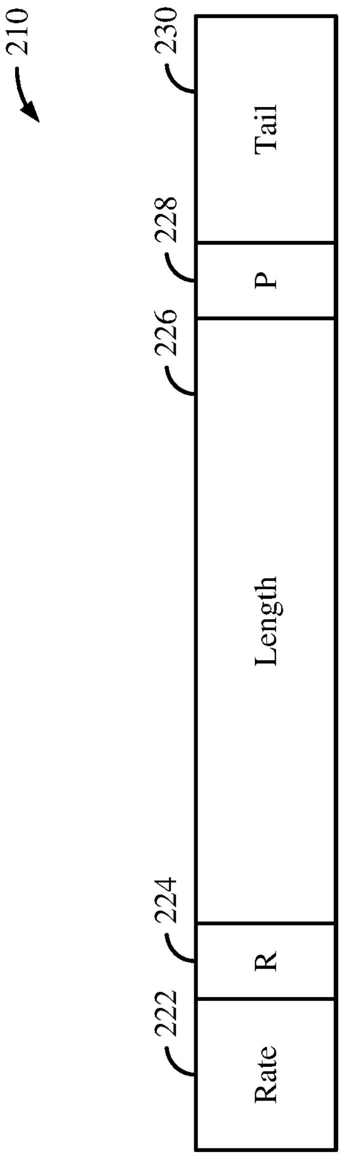
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
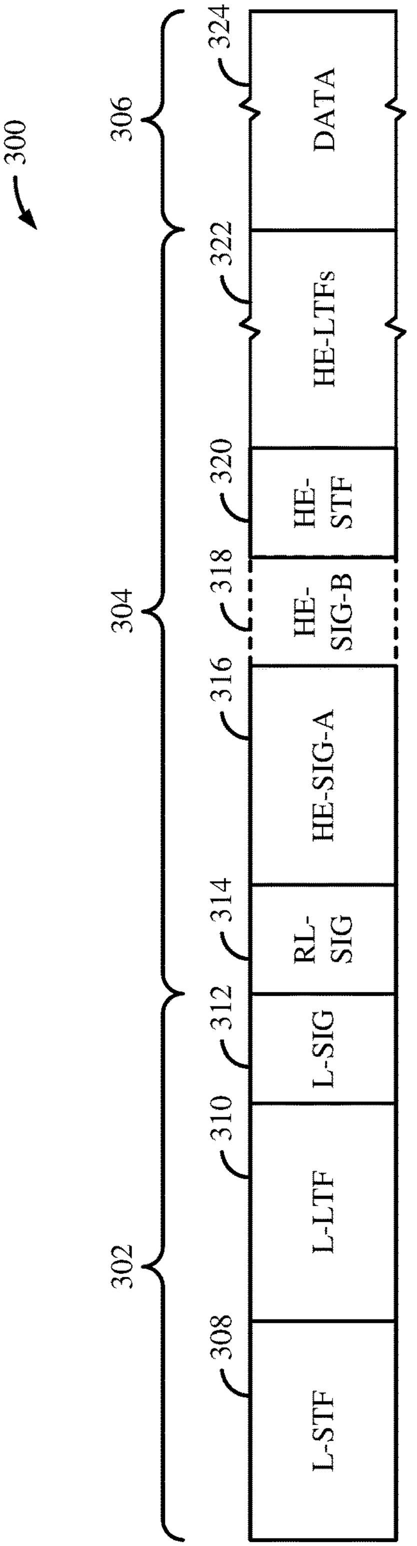
FIG. 3A shows an example physical layer (PHY) protocol data unit (PPDU) usable for wireless communication between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
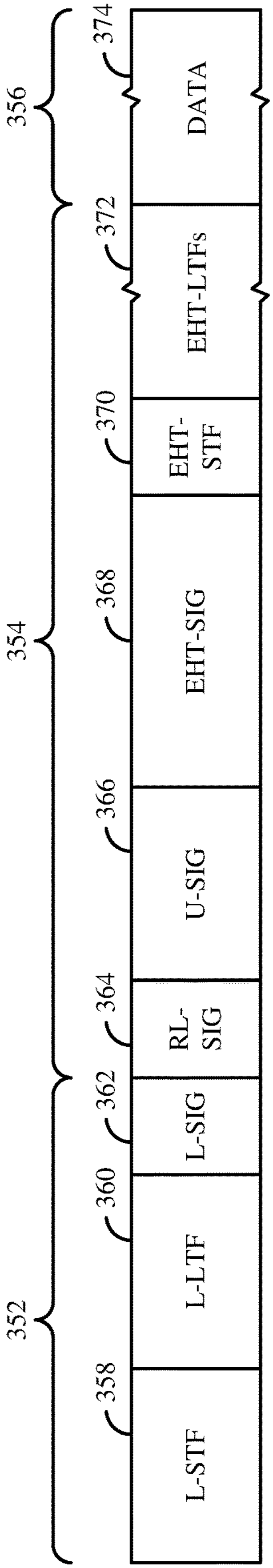
FIG. 3B shows another example PPDU usable for wireless communication between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Figure 4:
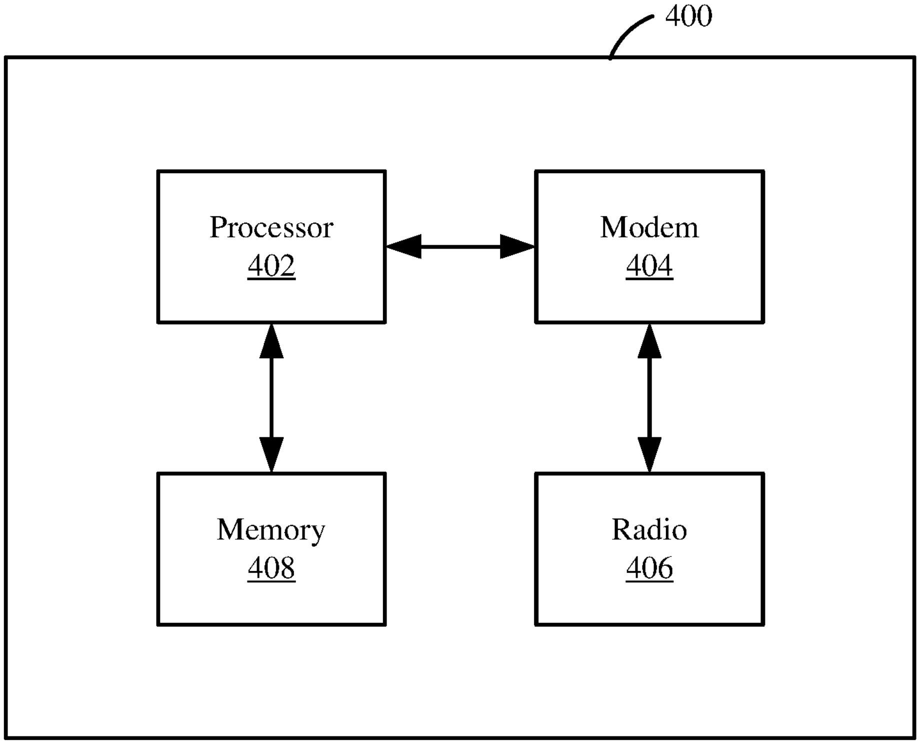
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described herein with reference to FIG. 1. In some implementations, the wireless communication device 400 can be an example of a device for use in an AP such as the AP 102 described herein with reference to FIG. 1. The wireless communication device 400 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 404, for example, a Wi-Fi (IEEE 802.11 compliant) modem. In some implementations, the one or more modems 404 (collectively "the modem 404") additionally include a WWAN modem (for example, a 3GPP 4G LTE or 5G compliant modem). In some implementations, the wireless communication device 400 also includes one or more processors, processing blocks or processing elements 404 (collectively "the processor 402") coupled with the modem 404. In some implementations, the wireless communication device 400 additionally includes one or more radios 406 (collectively "the radio 406") coupled with the modem 404. In some implementations, the wireless communication device 400 further includes one or more memory blocks or elements 408 (collectively "the memory 408") coupled with the processor 402 or the modem 404.

The modem 404 can include an intelligent hardware block or device such as, for example, an application-specific integrated circuit (ASIC), among other examples. The modem 404 is generally configured to implement a PHY layer, and in some implementations, also a portion of a MAC layer (for example, a hardware portion of the MAC layer). For example, the modem 404 is configured to modulate packets and to output the modulated packets to the radio 406 for transmission over the wireless medium. The modem 404 is similarly configured to obtain modulated packets received by the radio 406 and to demodulate the packets to provide demodulated packets. In addition to a modulator and a demodulator, the modem 404 may further include digital signal processing (DSP) circuitry, automatic gain control (AGC) circuitry, a coder, a decoder, a multiplexer and a demultiplexer. For example, while in a transmission mode, data obtained from the processor 402 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 402) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 404 are provided to the radio 406, which then transmits the symbols via the coupled antennas. Similarly, symbols received via the antennas are obtained by the radio 406, which then provides the symbols to the modem 404.

The processor 402 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 402 processes information received through the radio 406 and the modem 404, and processes information to be output through the modem 404 and the radio 406 for transmission through the wireless medium. For example, the processor 402 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 402 may generally control the modem 404 to cause the modem to perform various operations described herein.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 402, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

As used herein, a processing system of a wireless communication device may refer to one or more of the components 402, 404, or 408 of the wireless communication device 400. For example, a processing system may include one or more of the processor 402, at least a portion of the modem 404, or the memory 408. As used herein, an interface of a wireless communication device may refer to one or more of the components 404-406 of the wireless communication device 400. For example, an interface may include one or more of at least a portion of the modem 404 or the radio 406. In some implementations, the interface may include one or more antennas coupled to or included in the wireless communication device. While some examples of a processing system and an interface of a wireless communication device are provided, any suitable components of a wireless communication device may be included in a processing system and an interface of the wireless communication device. As such, the present disclosure is not limited to the provided examples.

Figure 5A:
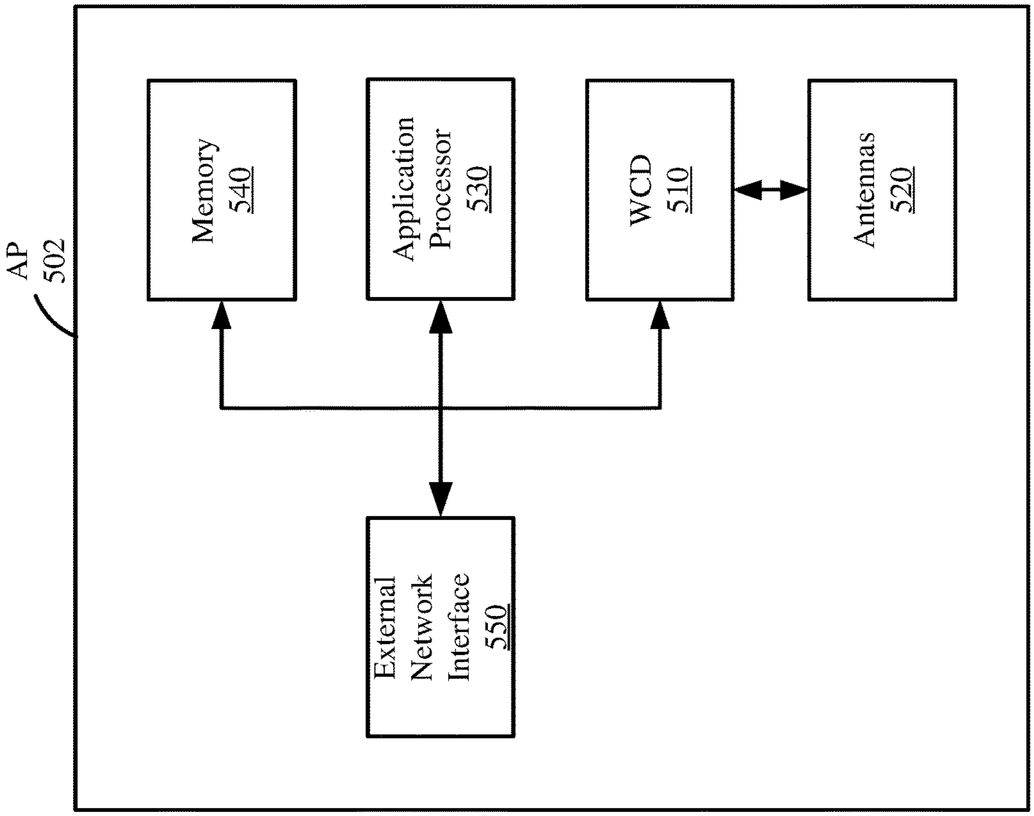
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

Figure 5B:
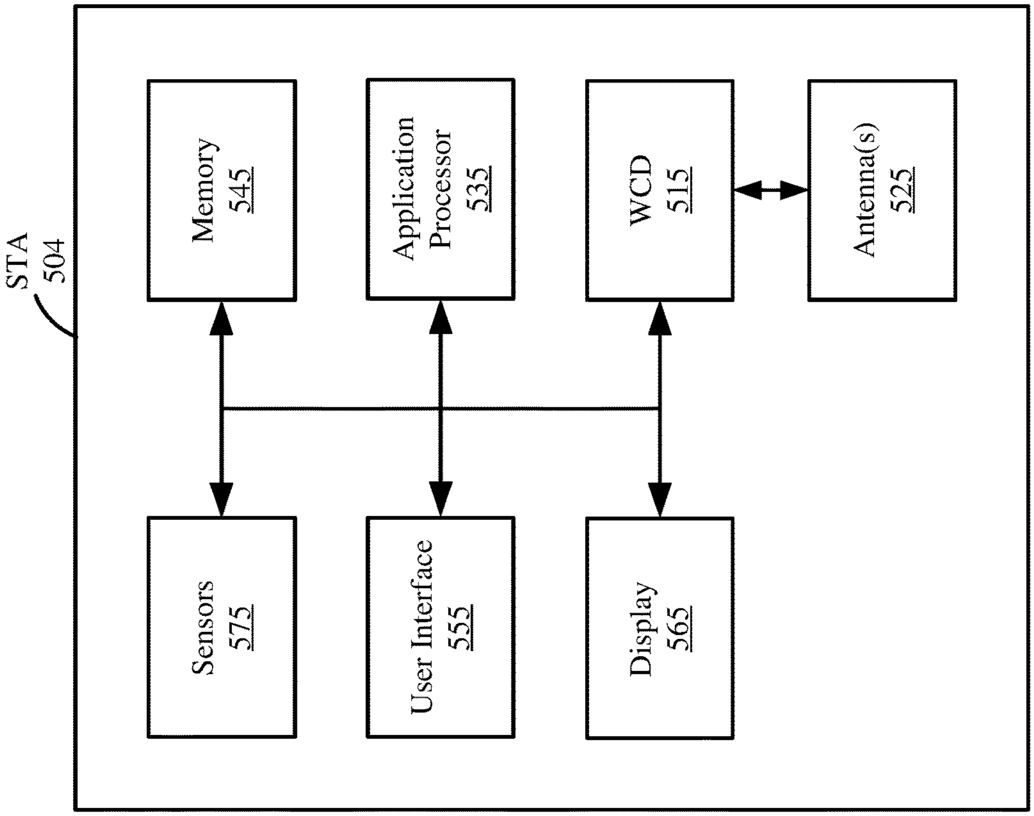
FIG. 5B shows a block diagram of an example station (STA).

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Figure 6:
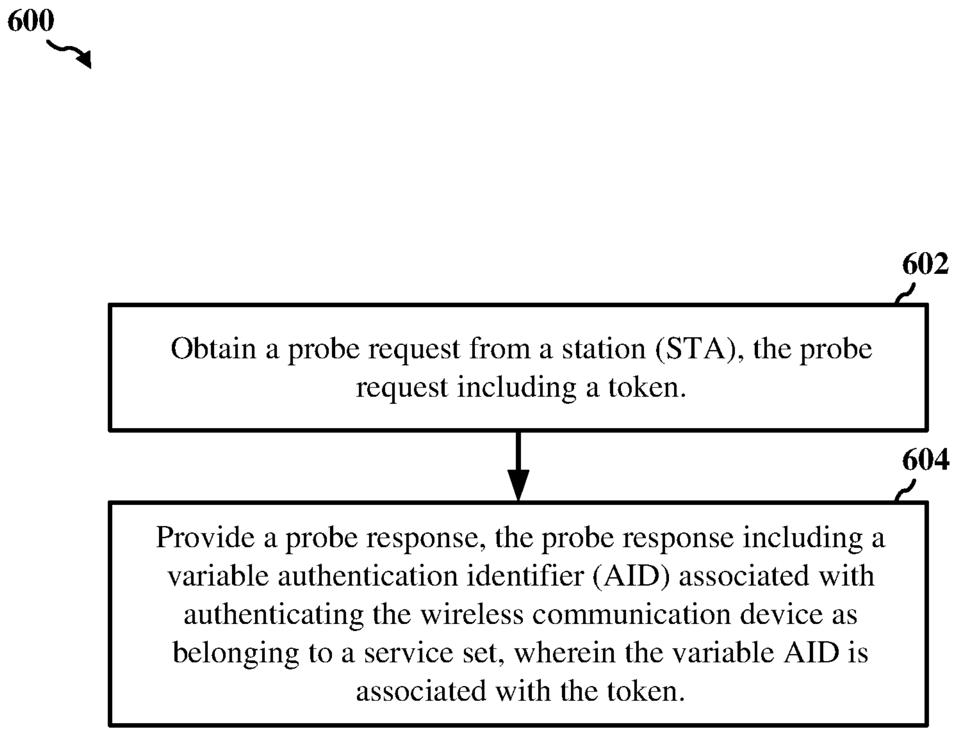
FIG. 6 shows a flowchart illustrating an example process of wireless communications including a variable authentication identifier (AID) by a wireless communication device.

FIG. 6 shows a flowchart illustrating an example process 600 of wireless communications including a variable AID by a wireless communication device. The operations of the process 600 may be implemented by an AP or its components as described herein. For example, the process 600 may be performed by a wireless communication device such as the wireless communication device 400 described herein with reference to FIG. 4. In some implementations, the process 600 may be performed by an AP, such as one of the APs 102 and 502 described herein with reference to FIGS. 1 and 5A, respectively. While the process 600 may be performed by any suitable device, the process 600 is described as being performed by the wireless communication device 400 for clarity.

At 602, the wireless communication device 400 (such as an interface of the wireless communication device 400) obtains a probe request from a STA. Obtaining the probe request may include one or more antennas coupled to the radio 406 receiving a signal including the probe request on a wireless channel, the radio 406 processing the signal, and the modem 404 obtaining the processed signal including the probe request from the radio 406. The modem 404 also may demodulate the probe request from a carrier of the processed signal and provide the probe request to the processor 402.

The probe request includes a token. The token may be used by a processing system of the wireless communication device 400 (such as the processor 402 and the memory 408) to verify that the STA was previously associated with the service set associated with the AP or previously provisioned to associate with APs in the service set. As used herein, a STA being associated with a service set refers to the STA being connected to and serviced by one of the APs of the service set. In some implementations, the token is provided to the STA by one of one or more APs of the service set during a previous association of the STA to the service set. In a BSS example, the wireless communication device 400 may provide the token to the STA when the STA was previously connected to the AP, and the STA may store the token. In this manner, if the AP identifies the token in a received probe request from a STA, the AP is able to confirm that the STA was previously connected to the AP. In an ESS example, any AP of the ESS (which may or may not be the current AP to be connected to by the STA) may provide the token to the STA when the STA was previously connected to that AP.

In some implementations, a STA previously associated with the service set may refer to one or more of the STA being previously connected to and serviced by one of the APs of the service set or the STA being provisioned to associate with the service set. In some implementations, a STA may be provisioned to associate with one or more APs of a service set without previously connecting to the one or more APs. For example, device provisioning protocol (DPP) or Wi-Fi protected setup (WPS) (which are defined in the Wi-Fi Alliance (WFA) set of standards) or another suitable provisioning protocol may be used to provide information to the STA to allow the STA to connect to one or more APs of a service set. Such a provisioning protocol may be used to provide a token to the STA during device provisioning for the service set. For example, a second device or another device provisioning component configured for DPP may be configured to provision a STA to be able to connect to one or more of the APs of the service set. In provisioning the STA, the second device may provide a token, key, or other suitable information to allow the STA to identify an AP as being associated with the service set. In some implementations of the device provisioning components being able to provide tokens, keys, or other suitable information to the STA, the tokens, keys, or other suitable information may be shared from one or more APs of the service set to the device provisioning components (or between device provisioning components). In some implementations of the device provisioning components being able to provide tokens, a token may be derived from a root key, and the root key may be shared from one or more APs of the service set to the device provisioning components (or between device provisioning components). The below examples are regarding sharing of a token, a root key, or other information among APs for clarity, but also apply to the sharing of such information to device provisioning components for scenarios where device provisioning is used.

For an ESS, the token may be shared among the APs of the ESS or may be derived from a root key shared among the APs. If the AP identifies the token in a received probe request as being associated with the ESS (such as being previously provided by an AP (or by a device provisioning component, such as during DPP) of the ESS or being generated using the root key), the AP is able to confirm that the STA was previously connected to an AP of the ESS (or previously provisioned by a device provisioning component to connect with an AP of the ESS). In this manner, the token may be associated with a specific service set instead of a specific AP. As used herein, a STA being previously connected to an AP may refer to the STA having been connected to the AP or the STA having been provisioned to connect to an AP of the service set (such as through the use of DPP).

At 604, the interface of the wireless communication device 400 provides a probe response. Providing the probe response may include the modem 404 modulating the probe response onto a carrier signal of a wireless channel and the radio 406 transmitting the signal via one or more antennas coupled to the radio 406. The probe response includes a variable AID associated with authenticating the wireless communication device 400 as belonging to a service set. For example, after the wireless communication device 400 verifies the token (thus confirming that the STA was previously associated with the service set based on the token in the probe request), a processing system of the wireless communication device 400 may generate a probe response to be transmitted to the STA. The probe response includes the variable AID to be used by the STA to authenticate that the AP is associated with a specific service set. After the STA authenticates the AP as being associated with the specific service set, the STA may begin associating with the AP, such as by sending an association request to the AP.

As used herein, the action of "obtaining" an object may refer to receiving the object, generating the object, determining the object, calculating the object, extracting the object, deriving the object, or any other suitable actions associated with obtaining the object. As used herein, the action of "providing" an object may refer to transmitting the object (which may include unicasts or broadcasts), providing the object for transmission, outputting the object, or any other suitable actions associated with providing the object.

The variable AID is associated with the token from the probe request. For example, the processing system of the wireless communication device 400 may use the token to generate the variable AID in a manner defined at both the AP and the STA. Based on the defined manner in generating the variable AID using the token, the STA receiving the probe response may process the variable AID to determine that the variable AID corresponds to the token to indicate that the AP is associated with the specific service set associated with the token. The token may be any suitable identifier of the STA as being previously associated with a service set. Similarly, the variable AID may be any suitable identifier of the AP as being an AP of the service set (also referred to as being associated with the service set). While some examples in generating the token and in generating the variable AID are described herein, generating the token and generating the variable AID may be performed in any suitable manner.

A probe request and a probe response are two of the twelve types of management frames defined by the IEEE 802.11 standards. In some implementations, the probe request including the token and the probe response including the variable AID conform to the IEEE 802.11 standards defining management frames.

Figure 7:
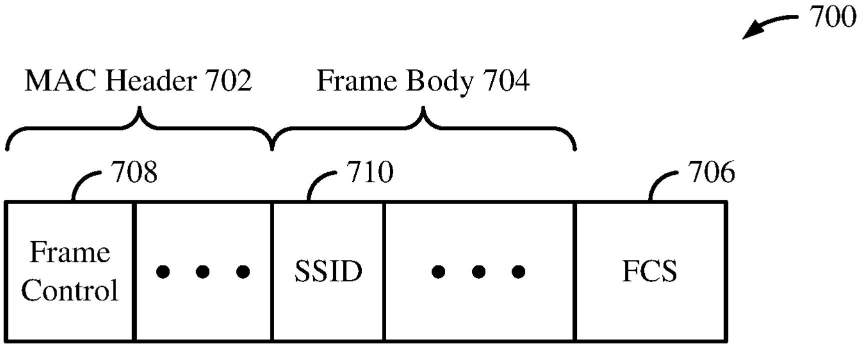
FIG. 7 shows an example MAC layer probe request frame.

FIG. 7 shows an example MAC layer probe request frame 700. A MAC layer frame may refer to an MPDU. The probe request frame 700 may be included in a PSDU of a PPDU. In some implementations, the probe request frame 700 may be included in the PHY payload 204 of the PPDU 200 depicted in FIG. 2A. In some implementations, the probe request frame 700 may be included in the PHY payload 306 of the PPDU 300 depicted in FIG. 3A. In some implementations, the probe request frame 700 may be included in the PHY payload 356 of the PPDU 350 depicted in FIG. 3B. The probe request frame 700 may be transmitted by a STA, such as a STA 104 in FIG. 1 or STA 504 in FIG. 5B.

Like most MAC layer frames, the probe request frame 700 includes a MAC header 702, a frame body 704, and a trailer 706. The MAC header 702 includes a plurality of fields, including a frame control (FC) field 708. The specific format of the MAC header and what other fields are to be included in the MAC header may be defined by a specific standard to which the probe request frame 700 is compliant (such as one of the IEEE 802.11a, 802.11n, 802.11ac, 802.11ax, 802.11ay, 802.11az, 802.11ba, 802.11be, or any suitable future IEEE standard). The FC field 708 indicates the type and subtype of the frame 700, with the type being a management frame and the subtype being a probe request frame. As such, the FC field 708 indicates to other devices receiving the frame 700 that the frame 700 is a management frame, and more specifically a probe request frame. While not shown, the MAC header 702 may include a source address field to indicate the source of the probe request (such as the MAC address of the STA) and may include a destination address field to indicate an intended destination of the probe request (such as a MAC address of a specific AP). The destination address field may include a value other than a specific MAC address so that the probe request frame 700 is treated as a broadcast to be received by any AP within range of the STA.

The frame body 704 may include a plurality of fields, including an SSID field 710. For typical probe request frames, the STA indicates the persistent SSID associated with the service set in the SSID field 710. As noted herein, the persistent SSID being provided in the SSID field 710 may be used as a means to track an AP associated with the service set and thus the SSID. Referring back to step 602 of process 600, the wireless communication device 400 (such as an AP) obtains a probe request including a token. In some implementations, the token is included in the SSID field 710. The token may be in place of the persistent SSID. The token may be any suitable value. As such, the token may be the same size as the SSID field, smaller than the SSID field, or larger than the SSID field. If the token is smaller than the SSID field, the remainder of the SSID field may be zero padded, padded with a random number, or otherwise filled in a manner that is decipherable by the AP. For example, a defined modulation with a timestamp or other information known at both the STA and the AP may be used to fill the SSID field 710. If the token is larger than the SSID field 710, a remainder of the token may be included in another portion of the frame body 704. How the token is inserted into the frame body 704 may be defined at both the STA and the AP so that the AP is able to recover the token from the probe request frame 700. In some implementations, the SSID field 710 may include a random value or some other value that is not associated with the SSID, and the token may be included in another portion of the frame body 704. For example, the SSID field 710 may include a wildcard or null value to indicate that any AP within range of the STA is to respond, and the token may be included in another portion of the frame body 704.

The STA may have been previously associated with a plurality of service sets that are configured to use variable AIDs for authentication. As such, the STA may have stored a plurality of tokens associated with different service sets. In some implementations, the STA may be configured to send a single probe request to attempt authentication for more than one service set. The probe request may include a plurality of tokens. In some implementations, if a token is smaller than the SSID field 710, the SSID field 710 includes the plurality of tokens. In some implementations, a plurality of tokens may be included in any suitable portion of the frame body 704, which may or may not include the SSID field 710. For example, the SSID field 710 may include a wildcard or null value, and a plurality of tokens may be included in other portions of the frame body 704. How the tokens are included in the probe request frame 700 may be defined at the STA and the AP. In this manner, the AP is able to recover the plurality of tokens from the probe request frame 700. The AP may attempt to verify one or more of the tokens (such as attempting to convert each token to an SSID based on a shared key between the STA and the AP or based on a list of tokens previously provided by one or more APs of the service set to STAs). If one of the tokens corresponds to the service set associated with the AP (such as the generated SSID matching the persistent SSID of the service set associated with the AP), the AP may transmit a probe response frame including a variable AID for the STA to authenticate the AP as being associated with the service set (such as described herein with reference to step 604 of process 600).

In some implementations, each token of a plurality of tokens may be included in a separate probe request frame.

The trailer 706 of the probe request frame 700 may include a Frame Check Sequence (FCS), which is a cyclic redundancy check (CRC) value that may be used to validate the contents of the frame. The FCS may be generated from the MAC header 702 and the frame body 704. While the examples depict one or more tokens as being included in the frame body 704 of the probe request frame 700, the one or more tokens may be included in any suitable portion of the frame 700 and may be included in any suitable manner. For example, one or more tokens may be included in the MAC header 702 (such as in a reserved portion of the header). If a STA is configured to provide a probe request including a token, the STA also is configured to not include a MAC address in a source address field and a destination address field of the probe request.

Figure 8:
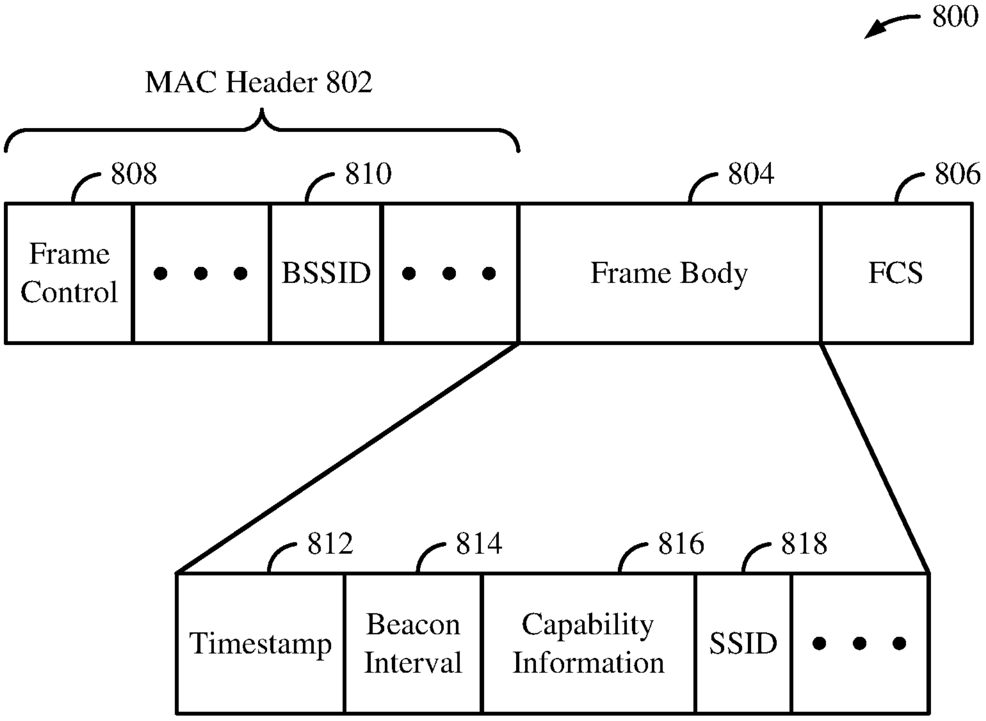
FIG. 8 shows an example MAC layer probe response frame.

FIG. 8 shows an example MAC layer probe response frame 800. The probe response frame 800 may be included in a PSDU of a PPDU. In some implementations, the probe response frame 800 may be included in the PHY payload 204 of the PPDU 200 depicted in FIG. 2A. In some implementations, the probe response frame 800 may be included in the PHY payload 306 of the PPDU 300 depicted in FIG. 3A. In some implementations, the probe response frame 800 may be included in the PHY payload 356 of the PPDU 350 depicted in FIG. 3B. The probe response frame 800 may be transmitted by an AP, such as AP 102 in FIG. 1 or AP 502 in FIG. 5A.

Similar to the probe request frame 700 (and other MAC layer frames), the probe response frame 800 includes a MAC header 802, a frame body 804, and a trailer 806. The MAC header 802 includes a plurality of fields, including an FC field 808. The MAC header 802 also includes a BSSID field 810. The specific format of the MAC header and what other fields are to be included in the MAC header may be defined by a specific standard to which the probe response frame 800 is compliant (such as one of the IEEE 802.11a, 802.11n, 802.11ac, 802.11ax, 802.11ay, 802.11az, 802.11ba, 802.11be, or any suitable future IEEE standard). Similar to the FC field 708, the FC field 808 indicates that type and subtype of the frame 800, with the type being a management frame and the subtype being a probe response frame. As such, the FC field 808 indicates to other devices receiving the frame 800 that the frame 800 is a management frame, and more specifically a probe response frame.

For typical probe response frames, the BSSID field 810 includes the persistent BSSID associated with the AP. For example, the BSSID field 810 may include the MAC address assigned to the AP. As noted herein, the MAC address of the AP being provided in a BSSID field 810 may be used as a means to track the AP. In some implementations, the BSSID field 810 may include a value other than the MAC address of the AP or otherwise may not be used to identify the AP by a STA not previously associated with the service set. For example, a different MAC address defined at both the STA and the AP or otherwise may be deciphered at the STA (such as the MAC address being based on a shared key between the STA and the AP) may replace the persistent MAC address assigned to the AP in the BSSID field 810. In this manner, the persistent MAC address may not be used in probe response frames. For other types or subtypes of frames (such as a probe request frame or a data frame), a persistent MAC address of the AP may be replaced with a different MAC address in a similar manner to protect the privacy of the AP. In addition to the persistent MAC address of the AP being replaced in frames to be transmitted (such as for a BSSID field or any other field in which the MAC address typically would be included), a persistent MAC address of a STA may be replaced in frames to be transmitted in a similar manner as described for the AP to protect the privacy of the STA.

While not shown, the MAC header 802 may include a source address field to indicate the source of the probe response (such as the MAC address of the AP) and may include a destination address field to indicate an intended destination of the probe response (such as the MAC address of the STA that provided the probe request). The AP may be configured to not include its MAC address in the source address field and not include the MAC address of the STA in the destination address field. For example, a temporary identifier of the MAC addresses may be used in the probe response frame, with the temporary identifiers being converted to a persistent MAC address at the device (such as at the STA receiving the probe response).

The frame body 804 may include a plurality of fields, including a timestamp field 812, a beacon interval field 814, a capability information field 816, and an SSID field 818. The timestamp field 812 includes a timestamp from a timer at the AP. The timestamp may be used by STAs to keep timings synchronized among that STAs in the service set. The beacon interval field 814 includes a value indicating an interval at which beacons are transmitted by the AP (if the AP is to transmit beacons). The capability information field 816 includes a value indicating the capabilities of the AP and service set (such as whether the AP is associated with an infrastructure network, whether wired equivalent privacy (WEP) is required, and so on). While not depicted in the probe request frame 700 in FIG. 7, a probe request frame also may include a capability information field.

The SSID field 818 may be similar to the SSID field 710 of the probe request frame 700. For typical probe response frames, the AP indicates the persistent SSID associated with the service set in the SSID field 818. As noted herein, the persistent SSID being provided in the SSID field 818 may be used as a means to track the AP. Referring back to step 604 of process 600, the wireless communication device 400 (such as an AP) provides a probe response including a variable AID. In some implementations, the variable AID is included in the SSID field 818. The variable AID may be in place of the persistent SSID. The variable AID may be any suitable value. In some implementations, the variable AID is in a format similar to an SSID so as to appear as a possibly valid SSID to other devices snooping the probe response. In some implementations, the SSID field 818 may include a random value or some other value that is not associated with the SSID, and the variable AID may be included in another portion of the frame body 804.

As described herein with reference to step 604 of process 600, the variable AID is associated with the token received in the probe request. For example, the variable AID may be generated from the token based on a key shared between the STA and the AP. The process of generating the variable AID may be defined at both the STA and the AP (such as generating the key from the token using a root key and generating the variable AID from the generated key, using a specific hash of the token based on the shared key as defined at each of the devices, or in another suitable manner). As such, the STA may be able to convert the variable AID to the token by reversing the process of generating the variable AID based on the token and the key. If the generated token matches the token provided in the probe request, the STA authenticates that the AP is associated with the service set. The STA may initiate associating with the service set by providing an association request to the AP.

Similar to the trailer 706 of the probe request frame 700, the trailer 806 of the probe response frame 800 may include a FCS. The FCS may be generated from the MAC header 802 and the frame body 804. While the examples depict a variable AID as being included in the frame body 804 of the probe request frame 800, the variable AID may be included in any suitable portion of the frame 800 and may be included in any suitable manner. For example, a variable AID may be included in the MAC header 802 (such as in a reserved portion of the MAC header 802 typically not in use).

As described, a variable AID instead of an SSID and a value other than a MAC address (such as for a BSSID field, a source address field, or a destination field) may be used in probe responses and probe requests. As noted herein, the variable AID may be associated with a key shared between the STA and the AP. In some implementations, the key is provided to the STA by one or more APs of the service set during a previous association of the STA to the service set. For example, an AP may provide the key to the STA when the STA is previously connected to the AP.

Referring back to FIG. 6, after a wireless communication device 400 obtains the probe request including the token in step 602, the wireless communication device 400 may verify the token before providing a probe response to the STA in step 604. In verifying the token, the wireless communication device 400 identifies whether the STA previously has been associated with the service set (which may include whether the STA has been provisioned for associating with the service set). Generating the variable AID and the probe response may be based on verifying the token.

Figure 9:
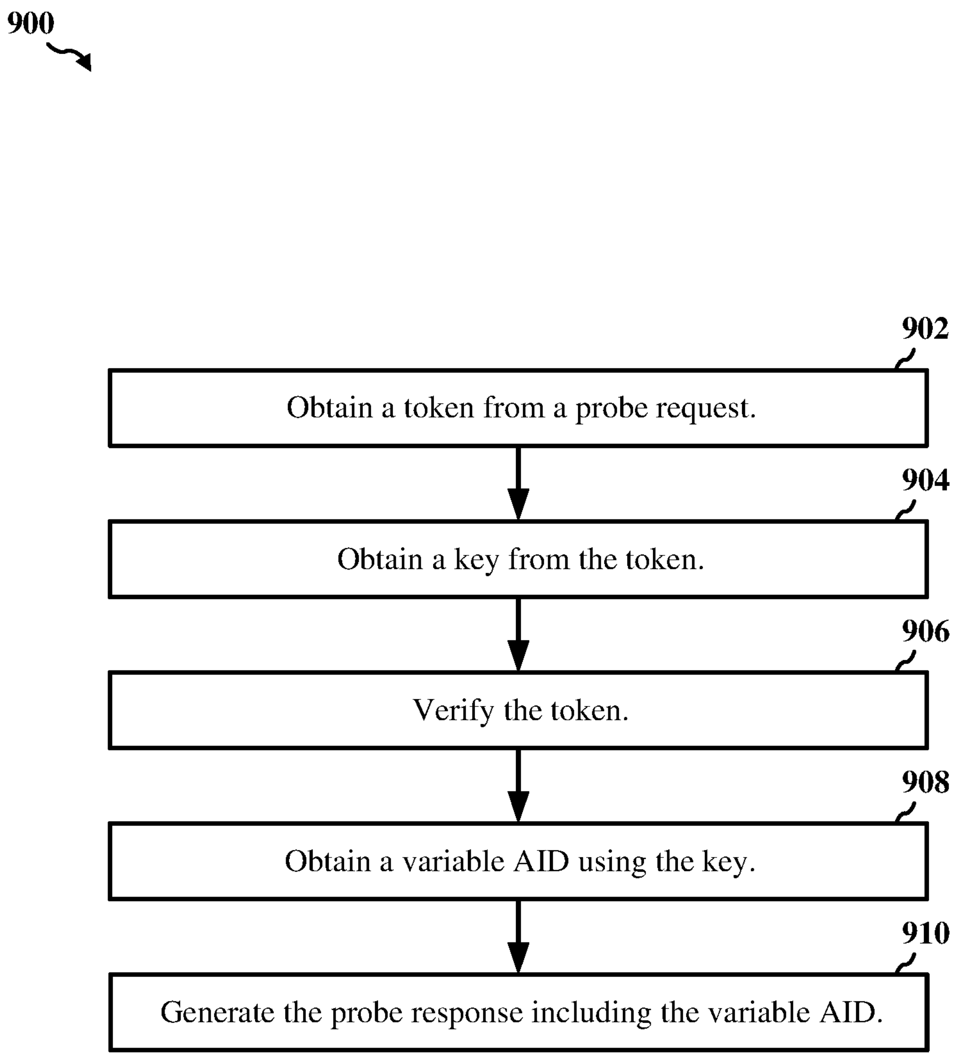
FIG. 9 shows a flowchart illustrating an example process of generating a probe response.

FIG. 9 shows a flowchart illustrating an example process 900 of generating a probe response. The operations of the process 900 may be implemented by an AP or its components as described herein. For example, the process 900 may be performed by a wireless communication device such as the wireless communication device 400 described herein with reference to FIG. 4. In some implementations, the process 900 may be performed by an AP, such as one of the APs 102 and 502 described herein with reference to FIGS. 1 and 5A, respectively. The process 900 may be performed in addition to process 600 described herein. While the process 900 may be performed by any suitable device, the process 900 is described as being performed by the wireless communication device 400 for clarity.

At 902, the wireless communication device 400 obtains a token from a probe request. Referring back to FIG. 6, the wireless communication device 400 may obtain a probe request including the token in step 602. If the token is included in an SSID field or another portion of a frame body of the probe request (such as the SSID field 710 or another portion of the frame body 704 of the probe request frame 700), the wireless communication device 400 may obtain the token from the SSID field or another portion of the frame body of the obtained probe request.

In some implementations, the token may be encrypted by the STA before transmitting the probe request. For example, an encryption function defined at both the STA and the AP may be used to encrypt the token. Obtaining the token from the probe request may include decrypting the token.

At 904, the wireless communication device 400 may obtain a key from the token. As noted herein, the token originally may be generated based on a root key stored at the AP. For example, a previous AP that provided the token to the STA may have generated the token using a defined hash or other operation based on the root key shared with any other APs of the service set. In another example, the previous AP may have provided a key generated from the root key to the STA, and the STA may have generated the token using a defined hash or other operation based on the key obtained from the previous AP. With how the token is generated being defined at the one or more APs of the service set (such as the hash used to generate the token being defined at the one or more APs or a root key being used to generate the token being shared among the one or more APs), the wireless communication device 400 may generate the key from the token based on the hash.

The key and the token may be associated with a root key. If the service set is an ESS including a plurality of APs, a root key (which also may be referred to as a "master key") may be shared among the plurality of APs. For example, a management server coupled to each of the APs of the ESS may generate a root key, and the management server may share the root key via a secured channel to one or more APs of the ESS. In another example, an AP may generate the root key and share the root key to one or more other APs of the ESS. In another example, the root key may be defined by a device manufacturer in building the AP, and the AP may share the root key to one or more other APs of the ESS. If the wireless communication device 400 is associated with an SAP, the SAP may not be connected to an ESS at all times. For example, a STA may be used as an SAP (such as, and without limitation, a smartphone being used as a personal hotspot), and the SAP may associate with an ESS so that other STAs may connect to the SAP and thus connect to the ESS. After the SAP associates with the ESS, the root key may be provided by a management server of the ESS or by another AP of the ESS. For example, the SAP may be placed near an AP of the ESS and an encrypted near-field communication (NFC) between the AP and the SAP may be used for the SAP to obtain the root key from the AP. The root key may be stored by the SAP for use during later associations with the ESS (such as after the STA stops acting as an SAP and the STA again acts as the SAP and is associated with the ESS). In another example, a root key may be provided manually by a user to the AP. For example, the user may enter a root key via a GUI of the AP.

An AP may use the root key to generate a key in any suitable manner, such as generating a public key (the key) based on a private key (the root key), generating the key as a random number, generating the key based on a token generated from the root key, and so on. In some implementations, the AP may combine the public key (the key) and the private key (the root key) to generate a shared secret (the token) in any suitable manner (such as using any suitable encryption algorithm). The AP may provide the public key (the key) and the shared secret (the token) to the STA when the STA is connected to the AP. When the STA attempts to associate with the service set in the future, the STA may use the token (such as in a probe request to actively scan for an AP associated with the service set). As described herein, generating the key may be based on the root key. For example, a key may be generated by applying a hash to a combination of a local time value and the root key. In some other implementations, the key may be randomly generated. As such, the disclosure is not limited to a specific means for generating the key. A randomly generated key or a key generated not based on the root key may still be associated with the root key based on being associated with the token that is also associated with the root key.

If an AP is able to obtain the key from the token, the AP may store only the root key. In some implementations, after an AP provides the token and the key to a STA, the AP may delete the token and the key or otherwise not store the token and the key. In this manner, the AP may store only the root key (such as in memory 408 of the wireless communication device 400). In some implementations of step 904, the wireless communication device 400 may obtain the key from the token using the root key. For example, the wireless communication device 400 may generate the key using the token obtained from the probe request and the root key stored in memory by performing the reverse of the operations used to generate the token from the root key and the key. In some other implementations, the AP also may store the key provided to the STA. If the AP is associated with an ESS and stores keys provided to STAs, the AP may share the keys with one or more APs of the service set.

At 906, the wireless communication device 400 may verify the token. If the key provided to the STA is saved at the AP, verifying the token may include comparing the generated key to a stored key. In some implementations, the wireless communication device 400 verifies the token using the root key. For example, if the key provided to the STA is not saved at the AP, the key is attempted to be obtained from the token. In some implementations, verifying the token may include attempting to regenerate the token using the obtained key and the stored root key. If the generated token matches the obtained token, the token may be verified. In some implementations, valid keys may be structured such that when a hash or other defined operation is performed on a valid key, the operation produces a known number or a known number format. For example, a key may be generated so that it may be validated using a CRC. In some implementations, verifying the token may include assuming that the obtained key is valid and generating a variable AID using the obtained key. If the key is not valid, the variable AID generated using the key cannot be used by the STA to authenticate the AP as being associated with the service set.

In some implementations, the token is associated with an expiry value. For example, the use of tokens may be configured such that the tokens expire over time. In this manner, when a token is generated, the token may be associated with a time when the token is to expire. For example, a token may expire two weeks or another amount of time after the token is generated. In some implementations, an AP that generates the token may use a local clock's output or other time value associated with the current time of generating a token. For example, the expiry value may indicate a defined amount of time later than the time value (such as two weeks later or another suitable amount of time later). In this manner, the expiry value may be generated from the time value. The token may include the expiry value. For example, the AP may generate a tuple of the key, the token, and the expiry value (if the expiry value is to be used). The token may refer to any portion of the tuple, such as the key and the token, the token and the expiry value, or all three values. In some implementations, the token included in a probe request includes the expiry value. For example, the expiry value may be concatenated or otherwise combined with a token and included in the SSID field 710 or another suitable portion of the frame body 704 of the probe request frame 700. In another example, the token may be included in the SSID field 710, and the expiry value may be included in another portion of the frame body 704.

In some implementations, generation of the token may be encryption based. For example, an AP may combine the expiry value and the key. The key may be generated based on the root key, may be generated based on a random value, or may be generated by other means. The AP may encrypt a combination of the expiry value and the key using the root key to generate the token. As used herein, combining two values may refer to any suitable operation to generate a single value from the two values. For example, the AP may concatenate the expiry value and the key, the AP may perform binary addition of the expiry value and the key, or the AP may perform another suitable operation. If concatenation is used to generate a concatenated string and the concatenated string is encrypted using the root key to generate the token, decryption of the token using the root key may produce the concatenated string indicating the expiry value and the key associated with the token. In some implementations, authentication encryption with associated data (AEAD) may be used to generate the token from the combined key and expiry value using the root key. If an expiry value is not to be used, the token may be generated from the key based on AEAD using the root key.

In some implementations, the means to generate the token may be derived from other technologies. For example, the 3GPP standards define an authentication and key agreement (AKA) mechanism used for wireless communications (such as for enhanced subscriber authentication (ESA)). As such, an AP may be configured to perform AKA. As noted herein, the token may be or include the tuple of the key and the token (or the key, the token, and the expiry value). In some implementations, the AP is configured to generate a tuple from the root key using AKA (similar to generating an authentication vector (AV) as defined in the 3GPP standards for 3G, 4G, and 5G). In some implementations, the AP generates a vector from the root key using AKA. As defined in the 3GPP standards, an AV may include an expected result and a network authentication token based on one or more keys (such as a cipher key and an integrity key). In some implementations, the vector generated from the root key (which may act as the cipher key) includes an expected result, and the shared key between the STA and the AP may be the expected result. The token generated from the root key may be similar to the network authentication token of an AV. If an expiry value is to be used, the expiry value may be similar to the integrity key. In this manner, the key and the token may be generated from the root key and the expiry value using AKA. While some examples for generating the token and the key are described herein, the token or the key may be generated in any suitable manner.

If an AP is to provide tokens or keys to a plurality of STAs, the AP may provide a unique token or key to each STA, or the AP may provide the same token or the same key to each STA. Similarly, each AP of multiple APs of an ESS may provide a unique token or key from tokens or keys provided by other APs of the ESS, or each AP may provide the same token or key as the other APs of the ESS. For example, one AP or a management server may generate the token or key and provide the token or key to one or more APs of the ESS. The APs of the ESS then may provide the token or key to one or more STAs connected to the AP.

If a unique token or key is provided to each STA, the token or key may be replaced for each time the STA is to associate with the service set. In some implementations, after the STA associates with the AP, the key may be replaced with a new key and the token may be replaced with a new token. For example, after the STA authenticates the AP as being associated with the service set, the STA may begin an association with the AP and connect to the AP. After the STA is connected to the AP, the STA may request a new token and key from the AP, and the AP may generate and provide a new token and a new key. The STA may store the new token and key obtained from the AP. In some implementations, the AP also may provide an expiry value. For example, the AP may provide a tuple including the key, the token, and the expiry value to the STA. In some implementations, the STA may use the expiry value to verify later if the token is still valid. If the STA verifies that the token expires, the STA may delete the token or otherwise not use the token to attempt to associate with the service set. In some implementations, the expiry value may be included in the probe request (such as part of the token in the SSID field 710 or another portion of the frame body 704 of a probe request frame 700). An AP receiving the probe request may obtain the expiry value and verify whether the token is still valid using the expiry value (such as described herein).

The new token and the new key may be used by the STA the next time the STA is to associate with the service set. As such, the token or the key may change over time to ensure that the same token and the same key is not used every time the STA is to associate with the service set. If the token is replaced by an AP of the service set each time the STA associates with the service set, a new token is used for each time the STA associates with the service set. Additionally, or alternatively, to replacing the token or the key after association, the AP may provide a new key or token (or both) in a frame body of a probe response or in another suitable manner. The token or key may be encrypted by the AP to ensure that the token or key cannot be determined by snooping the probe response or other frames including the token or key. If the new token or key is included in a probe response, the new token or key may be encrypted based on the token received in the probe request to authenticate the AP. If the new token or key is included in a data frame after a 4-way handshake between the STA and the AP (with the STA connected to the AP), the new token or key may be encrypted based on privacy keys that are shared during the 4-way handshake and are to be used for wireless communications while the STA is connected to the AP.

Referring back to step 906 of process 900, the wireless communication device 400 may verify whether the token is still valid using the expiry value. In some implementations, the expiry value may indicate an expiration time for the token. The AP may compare the time indicated by an expiry value to a current time (such as the time associated with a local clock of the AP indicated by the expiry value to a time at which the probe request is received as indicated by the local clock of the AP). If the expiry value indicates a time after the current time, the AP may verify that the token is still valid. If the expiry value indicates a time before the current time, the AP may verify that the token is expired.

While not depicted in process 900, in some implementations, the wireless communication device 400 may prevent providing a probe response to the STA if the token is not verified. For example, the wireless communication device 400 may identify that the key generated from the obtained token is not valid, that the token is no longer valid based on an expiry value, or that the token does not match a token previously provided to the STA. In some other implementations, the wireless communication device 400 may provide a probe response including a variable AID regardless of whether the token is valid or the token is not valid.

At 908, the wireless communication device 400 may obtain a variable AID using the key. In some implementations, the variable AID may be based on whether the token is valid. For example, if the token is not valid, the AP may be configured to provide a probe response including a first variable AID which prevents the STA from authenticating that the AP is associated with the service set. If the token is valid, the AP may be configured to provide a probe response including a second variable AID that can be used by the STA to authenticate that the AP is associated with the service set. In this manner, the variable AID included in the probe response includes the first variable AID if the token verification fails in step 906 (with the first variable AID being associated with preventing authentication of the wireless communication device), and the variable AID included in the probe response includes the second variable AID if the token verification succeeds in step 906 (with the second variable AID being associated with authenticating the wireless communication device).

As described herein, the second variable AID may be generated from the obtained key by using any suitable operation that can be reversed at the STA for the STA to obtain the token from the variable AID using the key stored at the STA. In this manner, if the token obtained from the variable AID matches the token provided in the probe request, then the STA authenticates the wireless communication device. In some implementations, the second variable AID may be generated from the obtained key and one or more fields transmitted in one or both of the probe request or the probe response by using a hash or any suitable operation that can be performed at the STA for the STA to obtain an expected variable AID using the key stored at the STA. In this manner, if the variable AID in the probe response matches the expected variable AID, then the STA authenticates the wireless communication device.

In some implementations, the first variable AID may be a random value or may be any other suitable value that appears to be a valid SSID but cannot be used to authenticate the wireless communication device. In this manner, a probe response including the first variable AID may appear to be a valid probe response to STAs snooping traffic from the AP. The first variable AID may change each instance the first variable AID is to be used (such as for each probe response). In this manner, the same AID is not used for each probe response. While some examples of generating a first variable AID are provided, the first variable AID may be generated in any suitable manner.

In some implementations, the variable AID is associated with a time when generating the variable AID. For example, a probe response may include a timestamp field (such as field 812 in the probe response frame 800). The timestamp may be an indication of how long a timekeeper included in the AP has been active. The timekeeper may include a counter (such as a 64 bit counter) to count the number of microseconds that the counter is active. The timestamp field may be a 64 bit field to include the count. The count to be included in the timestamp field may be used in generating the variable AID. For example, if the variable AID is to be a first variable AID, the first variable AID may be a number generated using the count so that the first variable AID changes over time. If the variable AID is to be a second variable AID, the second variable AID may be generated using the count. For example, the AP may combine the count with the key obtained from the token and generate the second variable AID from the combined count and key. The STA may obtain the token from the second variable AID using the value in the timestamp field of the probe response and the key stored at the STA. While some examples are provided, an AP may generate a variable AID to be associated with a time (such as a timestamp) in any suitable manner.

At 910, the wireless communication device 400 may generate the probe response including the variable AID. For example, the probe response may include the first variable AID if verification of the token fails, and the probe response may include the second variable AID if verification of the token succeeds. In some implementations, the wireless communication device 400 may generate a key from the token using the root key in step 904 and generate a variable AID using the key in step 908 regardless of whether the token is valid or not valid. For example, if an obtained token is not associated with the service set, the generated key is not a valid key. As such, the variable AID generated using the invalid key cannot be used by the STA to generate a valid token, thus preventing authentication of the wireless communication device. In this manner, verifying the token may be inherent in an operation of generating a variable AID from a key generated from the token in the probe request regardless of the token. A valid token is used to generate a valid key, and an invalid token is used to generate an invalid key. While some examples of verifying the token are provided, verifying the token may be performed in any suitable manner.

Referring back to FIG. 6, the wireless communication device 400 may provide the generated probe response including the variable AID to the STA in step 604. The STA may attempt to generate the token from the variable AID, and if the generated token matches the token provided in the probe request, the STA authenticates the wireless communication device 400. The token provided in the probe request is associated with the SSID of the service set to which the STA was previously associated, and the STA stores the SSID of the service set. If the STA authenticates the wireless communication device 400 using the token, the STA is able to obtain the SSID of the service set and may continue to associate with the wireless communication device 400. If the devices of the service set are configured to use temporary identifiers instead of persistent MAC addresses for wireless communications, the STA may continue to use a temporary identifier instead of a persistent MAC address for communicating with the wireless communication device 400. Similar to obtaining a new token and a new key, the STA may obtain a new temporary identifier for persistent MAC addresses from the wireless communication device 400 after connecting to the wireless communication device 400.

In some implementations, a STA also may use a challenge to authenticate an AP as being associated with a service set. The probe request may include a challenge from the STA, and the variable AID in the probe response from the AP is to be associated with the challenge to authenticate the AP. For example, the AP and the STA may be configured for challenge-response authentication in addition to the use of a token. The STA generates a challenge via a process defined at the AP and the STA, and the STA includes the challenge in the probe request (such as in the frame body 704 or another suitable portion of the probe request frame 700). The AP may obtain the challenge from the probe request and generate an answer to the challenge. The answer may be included in the variable AID, or the variable AID itself may be the answer to the challenge. For example, the challenge-response authentication mechanism may be defined such that the variable AID is to be generated from a combination of the key obtained from the token and the challenge in the probe request. In this manner, the STA may use the challenge in addition to the key to obtain the token from the variable AID or to generate an expected variable AID. The STA including a freshly generated challenge in a probe request prevents the probe response from being replayed by another device that is not associated with the service set but which is pretending to be an AP that is associated with a service set.

As noted herein, an AP may be configured to provide one or more of a new token, a new key, or a new expiry value to a STA. In some implementations, an interface of a wireless communication device may be configured to provide a tuple of a new key, a new token, and a new expiry value to the STA. In some implementations, the interface of the wireless communication device may be configured to provide more than one token, provide more than one key, or provide more than one expiry value. For example, a plurality of tuples may be provided by an AP to a STA. In some implementations, the AP may provide tuples previously provided by other APs of a ESS to other STAs. In this manner, the STA may perform active scanning for the service set at a later time using a plurality of tokens associated with the service set. As such, an interface of a wireless communication device may be configured to provide one or more new tokens, provide one or more new keys associated with the one or more new tokens, and provide one or more new expiry values associated with an expiration time of the one or more new tokens (if expiry values are to be used).

In addition to a probe request frame and a probe response frame, another type of management frame is a beacon frame. An AP may be configured to periodically transmit a beacon at a defined interval. A beacon typically is used to announce a service set to STAs within a coverage area. The beacon also indicates capabilities configured for the service set and transmission rates supported for the service set. The beacon also may include a delivery traffic indication map (DTIM) to be used to wake a STA in a low power state that is associated with the service set in order to obtain data to be transmitted to the STA.

Figure 10:
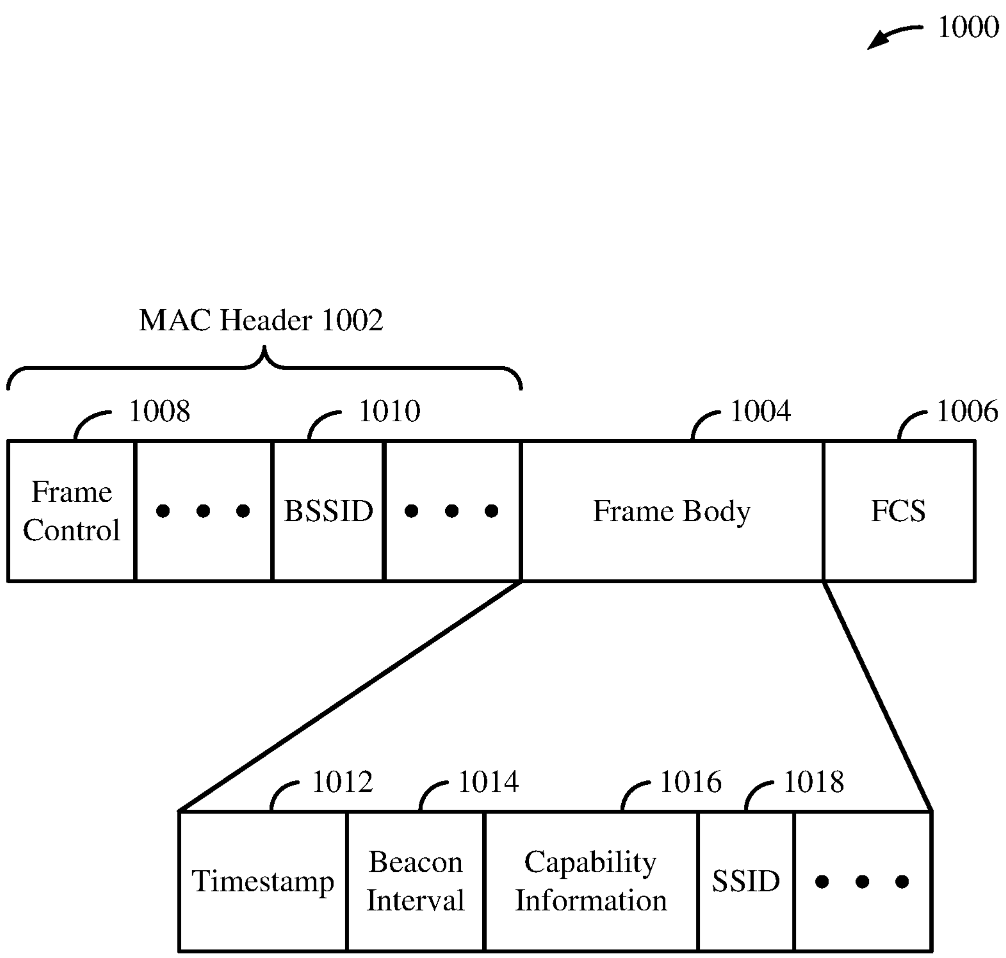
FIG. 10 shows an example MAC layer beacon frame.

FIG. 10 shows an example MAC layer beacon frame 1000. The beacon frame 1000 may be included in a PSDU of a PPDU. In some implementations, the beacon frame 1000 may be included in the PHY payload 204 of the PPDU 200 depicted in FIG. 2A. In some implementations, the beacon frame 1000 may be included in the PHY payload 306 of the PPDU 300 depicted in FIG. 3A. In some implementations, the beacon frame 1000 may be included in the PHY payload 356 of the PPDU 350 depicted in FIG. 3B. The beacon frame 1000 may be transmitted by an AP, such as AP 102 in FIG. 1 or AP 502 in FIG. 5A.

Similar to the probe request frame 700 and the probe response frame 800 (and other MAC layer frames), the beacon frame 1000 includes a MAC header 1002, a frame body 1004, and a trailer 1006. The MAC header 1002 includes a plurality of fields, including an FC field 1008. The MAC header 1002 also includes a BSSID field 1010. The specific format of the MAC header and what other fields are to be included in the MAC header may be defined by a specific standard to which the beacon frame 1000 is compliant (such as one of the IEEE 802.11a, 802.11n, 802.11ac, 802.11ax, 802.11ay, 802.11az, 802.11ba, 802.11be, or any suitable future IEEE standard). Similar to FC fields 708 and 808, the FC field 1008 indicates that type and subtype of the frame 1000, with the type being a management frame and the subtype being a beacon frame. As such, the FC field 1008 indicates to other devices receiving the frame 1000 that the frame 1000 is a management frame, and more specifically a beacon frame. For typical beacon frames, the BSSID field 1010 includes the persistent BSSID associated with the AP (such as the persistent MAC address assigned to the AP).

The frame body 1004 may include a plurality of fields, including a timestamp field 1012, a beacon interval field 1014, a capability information field 1016, and an SSID field 1018. In comparing the probe response frame 800 to the beacon frame 1000, the beginning of the frame body 804 may be the same as the beginning of the frame body 1004. The beginning of the frame body for both frames may have a mandatory format as defined by the IEEE 802.11 standards. As such, similar to described herein with reference to a probe response frame 800: the timestamp field 1012 includes a timestamp from a timer at the AP (such as a 64-bit counter at the AP counting the number of microseconds that the counter is active); the beacon interval field 1014 includes a value indicating an interval at which beacons are transmitted by the AP; the capability information field 816 includes a value indicating the capabilities of the AP and service set; and the SSID field 1018 typically includes the SSID of the service set. The additional fields of the frame body 1004 may differ from the additional fields of the frame body 804, which may be in a format dependent on the specific subtype of management frame. For example, the beacon frame 1000 may indicate beacon specific information in the other portion of the frame body 1004, such as a quiet duration that the AP is to be quiet (not transmit) between beacons or a DTIM. Similar to the trailer 706 of the probe request frame 700 and the trailer 806 of the probe response frame, the trailer 1006 of the beacon frame 1000 may include a FCS.

As depicted in FIG. 10, a beacon typically includes an SSID and a BSSID (which may be the persistent MAC address of the AP transmitting the beacon). As noted herein, the SSID or the BSSID may be used to track an AP or otherwise gather personal information regarding the AP. In some implementations, the AP may be configured to not transmit beacons, which prevents an SSID and a BSSID from being transmitted. For example, a processing system of a wireless communication device may be prevented from generating a beacon, or an interface of the wireless communication device may be prevented from providing a beacon for any STAs in the coverage area of the wireless communication device.

It may be desired for an AP to still transmit beacons without using an SSID and a BSSID. For example, beacons may be desired for waking already associated stations from a low power state (such as using a DTIM). In some implementations, an AP may be configured to transmit beacons without including an SSID and a BSSID. For example, the AP may transmit a beacon including a variable AID or other number in place of the SSID and including a temporary identifier in place of a persistent MAC address of the AP (similar to as described herein with reference to a probe response to include a variable AID and an identifier other than the AP's persistent MAC address). The variable AID (or other value in an SSID field) in a beacon may not be based on a token. For example, a probe response is solicited via a probe request, and the probe request may include a token. As such, the variable AID in the probe response may be generated using the token from the probe request. However, beacons may be unsolicited transmissions. In some implementations, the variable AID in the beacon may be similar to a second variable AID in the probe response (as described herein). For example, the SSID field in the beacon frame may include a random number or other number generated in any suitable manner.

In some implementations, the AP may be configured to authenticate a STA via a challenge issued by the AP (referred to as an AP challenge). Similar to the AP and STA being configured for challenge-response authentication for which the STA generates a challenge, the STA and the AP may be configured for the AP to generate the AP challenge. In some implementations, the variable AID in the beacon may be or include the AP challenge generated by the AP. In some implementations, the AP challenge may be separate from the variable AID and included in any suitable portion of the beacon. The STA is configured to provide a response to the AP challenge if the STA is to reply. In some implementations, the response to the AP challenge may be included in a probe request from the STA.

Figure 11:
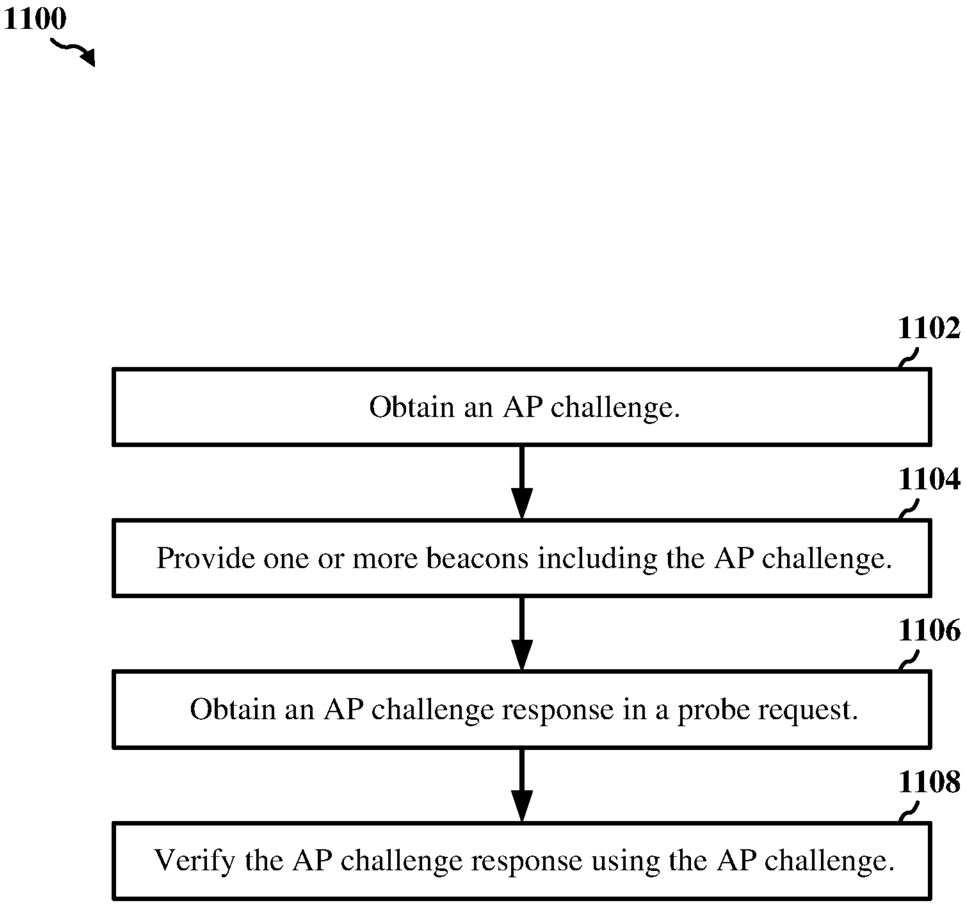
FIG. 11 shows a flowchart illustrating an example process of authenticating a STA.

FIG. 11 shows a flowchart illustrating an example process 1100 of authenticating a STA. The operations of the process 1100 may be implemented by an AP or its components as described herein. For example, the process 1100 may be performed by a wireless communication device such as the wireless communication device 400 described herein with reference to FIG. 4. In some implementations, the process 1100 may be performed by an AP, such as one of the APs 102 and 502 described herein with reference to FIGS. 1 and 5A, respectively. The process 1100 may be performed in addition to one or both of process 600 or process 900 described herein. While the process 1100 may be performed by any suitable device, the process 1100 is described as being performed by the wireless communication device 400 for clarity.

At 1102, the wireless communication device 400 may obtain an AP challenge. In some implementations, the processing system of the wireless communication device 400 may generate the AP challenge. In some implementations, another device of the service set may generate the AP challenge to be used and provide the AP challenge to the wireless communication device 400. For example, a management server of an ESS may be configured to generate an AP challenge to be used by a plurality of APs in the service set. The AP challenge may be generated in any suitable manner based on the challenge response authentication mechanism to be used. In some implementations, the AP challenge is randomly generated.

At 1104, the wireless communication device 400 provides one or more beacons including the AP challenge. As noted herein, the AP challenge may be included in any suitable portion of the beacon. For example, a randomly generated AP challenge may be the variable AID in the beacon. To note, the variable AID in the beacon may not be configured for use by a STA in authenticating the wireless communication device 400. In some implementations, the AP challenge may change over time. The wireless communication device 400 periodically may obtain the AP challenge, with the AP challenge differing between instances of obtaining the AP challenge. For example, each beacon may include a different AP challenge. The wireless communication device 400 may generate (or may obtain from another device) a new AP challenge for each beacon to be transmitted.

At 1106, the wireless communication device 400 may obtain an AP challenge response in a probe request. For example, a STA receiving the beacon provided by the wireless communication device 400 (or provided by another AP of an ESS for which a same AP challenge is used among APs) may obtain the AP challenge from the beacon, generate an AP challenge response as defined by the challenge response authentication mechanism used, and include the AP challenge response in the probe request obtained by the wireless communication device 400. The challenge response authentication mechanism may use the input of a secret value (which can be determined by both the STA and AP). For example, the STA may apply a defined operation using the key associated with the token that is provided in the probe request to generate a secret value, or the STA may obtain the secret value from the stored key in a defined manner. The STA may provide the secret value as the AP challenge response or may use the secret value to generate the AP challenge response in a defined manner. The STA may provide the AP challenge response including the secret value or otherwise to be used by the AP to derive the secret value (which is known at the AP). The AP challenge response may be included in any suitable portion of the probe request (such as in any suitable portion of the frame body 704 of the probe request frame 700).

In some implementations, the AP challenge response is associated with the challenge that may be generated by the STA and included in the probe request as described herein. For example, the STA may generate an answer to the AP challenge as defined by the challenge response mechanism, and the STA may apply an encryption or other suitable operation to the answer using the challenge generated by the STA as the key. The output of the encryption or operation may be the AP challenge response included in the probe request. In another example, the challenge generated by the STA may be or include the AP challenge response for the AP challenge.

At 1108, the wireless communication device 400 may verify the AP challenge response using the AP challenge. For example, the wireless communication device 400 may identify whether the AP challenge response is a valid answer based on the AP challenge. Verifying the AP challenge response may be any suitable operation as defined for the challenge response authentication mechanism. For example, the AP may apply an operation using the key associated with the token provided in the probe request, or a value obtained from this key. If the AP challenge response also is associated with the challenge generated by the STA (such as the AP challenge response being generated using the challenge or the challenge including the AP challenge response), the wireless communication device 400 also may verify the AP challenge response using the challenge. For example, if an encryption was applied to an answer to generate the AP challenge response (with the challenge as the key), the wireless communication device 400 may decrypt the AP challenge response using the challenge in order to verify the decrypted answer based on the AP challenge. In another example, if the AP challenge response is the challenge, the wireless communication device 400 may determine if the challenge is a valid answer to the AP challenge. In this manner, the wireless communication device 400 may generate and provide an answer to the challenge (which is an answer to the AP challenge) so that the wireless communication device may authenticate the STA and the STA may authenticate the wireless communication device based on the probe request and the probe response. Authenticating the STA may refer to identifying that the STA previously was associated with the service set. For example, during a previous association with the service set, the STA may obtain the parameters of the challenge response authentication mechanism in order to provide a valid answer to an AP challenge. The STA being able to provide a valid answer indicates that the STA was previously associated with the service set.

In some implementations, the AP may provide the first variable AID in the probe response if the AP is unable to verify the AP challenge response (and thus authenticate the STA), and the STA is unable to authenticate the AP using the first variable AID. If the AP verifies the AP challenge response (and thus authenticates the STA), the AP may provide the second variable AID in the probe response to be used by the STA to authenticate the AP. In some implementations, the AP may prevent providing a probe response to the STA if the AP is unable to verify the AP challenge response.

The AP challenge response may be the answer to the AP challenge included in the last one or more beacons. In some implementations, the AP challenge response is to be the answer to the AP challenge in the most recent beacon transmitted by the AP. If the AP challenge response is the answer to a previous AP challenge, the AP may not verify the AP challenge response. In some implementations, the AP challenge response may be the answer to any one of the AP challenges included in the last number of beacons. The AP may store the last number of AP challenges used, and the AP may attempt to use each of the stored AP challenges (such as from most recent to oldest AP challenge stored by the AP) to verify an AP challenge response obtained from a probe request.

In some implementations, the AP may be configured to identify the AP challenge to the STA. For example, if the AP is unable to verify the AP challenge response or the AP challenge response is missing from the probe request, the AP may include an identifier to the AP challenge in a probe response to allow the STA an attempt to provide a correct AP challenge response. In some implementations, the probe response may include an AP challenge (which may be the same AP challenge included in the last beacon or may be a new AP challenge). In some implementations, the probe response may include an identifier of the AP challenge in the one or more beacons. The identifier may indicate a field, a range of bits, or other value to indicate a location of the AP challenge included in the beacon. The AP challenge or the identifier may be included in any suitable portion of the probe response as defined for the challenge response authentication mechanism being used. The STA may obtain the AP challenge from the probe response, generate an AP challenge response, and include the AP challenge response in a new probe request to the AP. If the probe response includes an identifier, the STA may obtain the identifier from the probe response to identify the location of the AP challenge in a beacon frame. The STA may obtain the AP challenge from the next beacon from the AP using the identifier, generate an AP challenge response, and include the AP challenge response in a new probe request to the AP.

The example processes described with reference to FIGS. 6, 9, and 11 are from the perspective of the AP. For example, the wireless communication device performing operations of one or more of processes 600, 900, or 1100 may be an AP or may be included in an AP. As noted herein, a wireless communication device may be a STA or may be included in a STA. A STA configured to use tokens, variable AIDs, identifiers instead of persistent MAC addresses, or other means described herein to protect AP and STA privacy performs one or more operations to authenticate an AP (or to assist with an AP authenticating the STA for an AP challenge). Example operations that may be performed from the perspective of the STA are depicted in example process 1200 in FIG. 12 and example process 1300 in FIG. 13.

Figure 12:
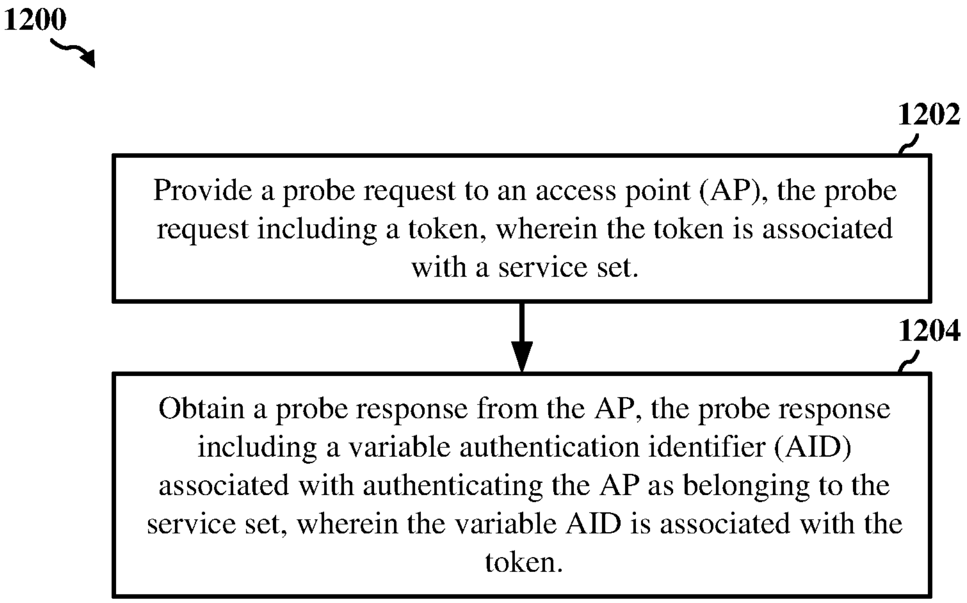
FIG. 12 shows a flowchart illustrating an example process of wireless communications including a variable AID by a wireless communication device.

FIG. 12 shows a flowchart illustrating an example process 1200 of wireless communications including a variable AID by a wireless communication device. The operations of the process 1200 may be implemented by a STA or its components as described herein. For example, the process 1200 may be performed by a wireless communication device such as the wireless communication device 400 described herein with reference to FIG. 4. In some implementations, the process 1200 may be performed by a STA, such as one of the STAs 104 and 504 described herein with reference to FIGS. 1 and 5B, respectively. In contrast to the process 600, which is from the perspective of the AP, the process 1200 is from the perspective of the STA. While the process 1200 may be performed by any suitable device, the process 1200 is described as being performed by the wireless communication device 400 or a STA for clarity.

At 1202, an interface of the wireless communication device 400 may provide a probe request to an AP. The probe request includes a token, and the token is associated with a service set. The probe request provided by a STA in step 1202 may be the same as the probe request obtained by an AP in step 602 of process 600. As described with reference to FIG. 6 and FIG. 7, the token may be any suitable number, in any suitable format, and located in any suitable location of the probe request. As noted herein, a STA may include a plurality of tokens (such as each token being associated with a different service set). In some implementations, the probe request may include a plurality of tokens (with each token associated with a different service set).

As described herein, the STA may obtain the token that is to be included in the probe request from one of one or more APs of the service set during a previous association of the wireless communication device to the service set (which may include the STA being previously connected to and serviced by an AP of the service set or the STA being provisioned to associate with the service set). For example, when the STA previously is connected to an AP of the service set, the STA may receive a tuple of a key, a token, and an expiry value (if used) from the AP. The token may be received after association or after a 4-way handshake with the AP. For example, after the 4-way handshake is completed, the STA may obtain a tuple and may obtain a temporary identifier to be used as the MAC address for wireless communications with the AP. In another example, the STA may obtain the tuple from a device provisioning component (such as another STA) during DPP.

As described herein, the token may be associated with an expiry value, which may be used by the AP to verify a token provided in a probe request. In some implementations, providing the token in the probe request is associated with an expiry value. For example, the STA may obtain the expiry value in a tuple from an AP. If the STA uses the expiry value to identify that the token is no longer valid, the STA may prevent including the invalid token in a probe request. As described, the STA may obtain the expiry value from one of the one or more APs of the service set during a previous association or provisioning (such as obtaining a tuple including the expiry value).

At 1204, an interface of the wireless communication device 400 may obtain a probe response from the AP. The probe response may include a variable AID associated with authenticating the AP as belonging to the service set, and the variable AID may be associated with the token. The probe response obtained by a STA in step 1204 may be the same as the probe response provided by an AP in step 604 of process 600. As described herein, in addition to the use of a variable AID, the probe request and the probe response may include an identifier shared between the AP and the STA instead of a persistent MAC address of the AP or the STA.

The STA may obtain the variable AID from the probe response, and the STA may verify the variable AID. In some implementations, a key shared between the AP and the STA is used to verify the variable AID. As described herein, the variable AID may be associated with a key shared between the AP and the STA. The key may be obtained by the STA from one of one or more APs of the service set during a previous association with the set. For example, the STA may obtain a tuple during a previous connection to an AP of the service set, with the tuple including the token and the key and with the token being generated from the key and a root key. The STA provides the token in a probe request, the AP obtains the key from the token in the probe request using the root key, and the AP generates the variable AID using the key. The STA obtains the token from the variable AID using the key and verifies whether the token from the variable AID matches the token from the tuple. In this manner, the STA may verify the variable AID by verifying the token obtained from the variable AID using the key.

As described herein, the variable AID may include a first variable AID to prevent authentication of the AP or may include a second variable AID to authenticate the AP. For example, if the AP is unable to verify the token, the AP identifies that the token is no longer valid, or the AP is unable to verify an AP challenge response to an AP challenge in a beacon, the variable AID in the probe response may include the first variable AID. As described herein, the probe request may include a challenge from the STA. Whether the variable AID includes the first variable AID or the second variable AID is associated with the challenge. For example, an answer to the challenge may be used to generate the variable AID, or the answer may be the variable AID. The first variable AID is associated with an incorrect answer, and the second variable AID is associated with a correct answer. As described herein, a variable AID also may be associated with a time when the variable AID is generated by the AP.

After the STA successfully verifies the variable AID (authenticating that the AP is associated with the service set), the STA may initiate a connection of the STA to the service set. For example, the interface of the wireless communication device may provide an association request to the AP to initiate a connection to the AP.

The STA may obtain one or more new tokens, one or more new keys associated with the one or more new tokens, or one or more new expiry values associated with an expiration time of the one or more new tokens from the AP. For example, the STA may obtain one or more new tuples from the AP. In some implementations, the one or more new tokens, the one or more new keys, and the one or more new expiry values (if expiry values are to be used) are obtained during provisioning of the STA for use of the service set. For example, a STA may obtain a tuple from an AP after associating with the AP and during or after a 4-way handshake with the AP. In some implementations, the tuple may be included in a probe response or otherwise before provisioning of the STA.

In some implementations, the STA may be configured to provide an AP challenge response to an AP challenge from the AP, and the STA connecting to the AP may be dependent on the AP challenge response.

Figure 13:
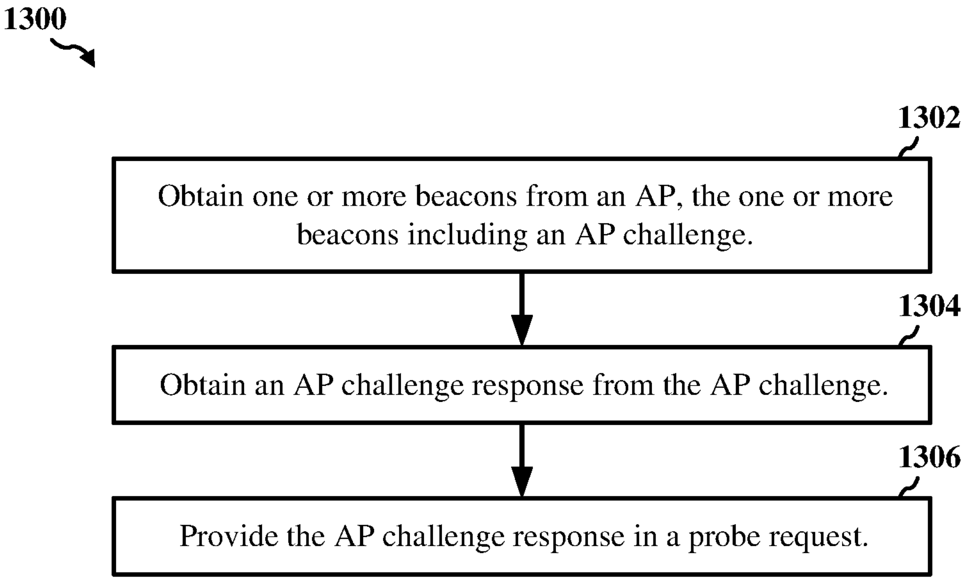
FIG. 13 shows a flowchart illustrating an example process of providing an AP challenge response for authenticating a STA.

FIG. 13 shows a flowchart illustrating an example process 1300 of providing an AP challenge response for authenticating the STA. The operations of the process 1300 may be implemented by a STA or its components as described herein. For example, the process 1300 may be performed by a wireless communication device such as the wireless communication device 400 described herein with reference to FIG. 4. In some implementations, the process 1300 may be performed by a STA, such as one of the STAs 104 and 504 described herein with reference to FIGS. 1 and 5B, respectively. In contrast to the process 1100, which is from the perspective of the AP, the process 1300 is from the perspective of the STA. The process 1300 may be performed in addition to process 1200 described herein. While the process 1300 may be performed by any suitable device, the process 1300 is described as being performed by the wireless communication device 400 or a STA for clarity.

At 1302, the wireless communication device 400 may obtain one or more beacons from an AP, and the one or more beacons may include an AP challenge. As described herein, the AP may be configured to generate an AP challenge to be used in identifying that the STA previously was associated with the service set. In some implementations, the AP challenge is different in each beacon.

At 1304, the wireless communication device 400 may obtain an AP challenge response from the AP challenge. For example, the STA may generate the AP challenge response to be or include a valid answer to the AP challenge.

At 1306, the wireless communication device 400 may provide the AP challenge response in the probe request. Referring back to process 1100, the AP receiving the probe request may verify the AP challenge response. As such, the AP may identify whether the wireless communication device was previously associated with the service set or otherwise whether the wireless communication device may associate with the AP. As described herein, the probe response obtained from the AP may include an identifier of the AP challenge in the one or more beacons, or the probe response may include an AP challenge (which may be the most recent AP challenge included in the one or more beacons or a new AP challenge).

Also as described herein, the AP challenge response may be associated with the challenge in the probe request. In some implementations, the wireless communication device 400 may generate a challenge that includes the AP challenge response or otherwise is associated with the AP challenge response. As such, the AP may use the challenge to verify the AP challenge response. Also as described herein, the AP challenge response may be associated with the AP challenge in the most recent beacon transmitted by the AP, or the AP challenge response may be associated with a previous AP challenge from a most recent number of beacons transmitted by the AP.

For a STA to successfully authenticate an AP as being associated with a service set, the STA is to have been previously associated with the service set (such as having been previously connected to the AP of a service set, having been previously connected to a different AP of an ESS, or having been provisioned to associate with the service set). As such, an AP is able to service STAs previously associated with the service set, but the AP may not service STAs that have never been previously associated with the service set or whose previous associations are too old. For example, if a STA has never connected to the service set and has not been provisioned for the service set, the STA does not receive a tuple or receive parameters for generating a challenge or an AP challenge response. As such, the STA does not associate with the AP configured to use a variable AID. In another example, the STA may have been previously associated with the service set and received a tuple, but enough time may pass after the previous association such that the token is no longer valid. In another example, some older devices unable to be configured to use variable AIDs and thus requiring a persistent SSID (referred to as legacy devices) may not be able to associate with the AP configured to use a variable AID.

In some implementations, the AP may be able to switch between a privacy mode and a legacy mode. The privacy mode refers to a mode in which a token, a variable AID instead of a persistent SSID, and an identifier instead of a persistent MAC address are used in wireless communications with the AP for protecting the privacy of the AP and the STA. The legacy mode may refer to a mode in which a persistent SSID and a persistent MAC address are used in wireless communications, such as a probe response and beacons, to allow a legacy STA or a STA not previously associated with the service set to associate with the AP. Once the STA is associated with the AP in the legacy mode (and the STA is capable of using tokens and variable AIDs), the AP may provide to the STA a tuple and an identifier associated with the persistent MAC address of the AP for future association attempts by the STA to the service set.

In some implementations, switching modes is in response to a manual input by a user. For example, the AP may be configured to be in a privacy mode by default. A user desiring for the AP to operate in a legacy mode may, for example, press a button or flip a physical switch located on the AP that is associated with switching modes, use a GUI on a display of the AP to indicate that the AP is to switch modes, use a wired connection to provide an indication to the AP to switch modes, or otherwise perform an operation that may not be replicated by a remote device without physical interaction with the AP. In some implementations, the AP may be configured to remain in the legacy mode for a temporary amount of time (such as for a few minutes or another amount of time defined at the AP), and the AP may revert to the privacy mode after the temporary amount of time lapses. In some implementations, the AP may remain in the legacy mode until the user indicates that the AP is to revert to the privacy mode.

In some implementations, the beacon or another management frame from the AP may include a flag or other indicator that the AP is in a privacy mode. In some implementations, a beacon may be configured to include a first flag to indicate that persistent MAC addresses are included or are not included and a second flag to indicate that persistent SSIDs are included or are not included). Any suitable indicator may be used. For example, the one or more flags may be included in a reserved portion of MAC header or a defined portion of the frame body so that a STA receiving the beacon is able to identify whether the AP is in a privacy mode. In some implementations, a probe response may be configured to include one or more flags or indicators. For example, if an AP is configured to not transmit beacons, a STA may identify that the AP is in a privacy mode from the one or more flags or indicators in the probe response.

In some implementations, an identifier for a persistent MAC address may be valid for longer than a token. In this manner, the identifiers in place of persistent MAC addresses may be used successfully by a STA in communicating with an AP, but the STA may be unable to authenticate the AP because of an invalid token in order to associate with the AP. In some implementations, the AP may be configured to be placed into a semi-private mode in which the AP includes the SSID in frames to the STA (such as in beacons and probe responses) but includes the identifier instead of a persistent MAC address. A user may determine which of the modes to place the AP, such as via a three position switch or button located on the AP, via a GUI on a display of the AP, or via other suitable means. For example, the user may place the AP into a semi-private mode to service a STA known to have previously been connected to the AP, or the user may place the AP into a legacy mode to service a legacy STA or a STA that has never been associated with the service set.

As described, an AP and a STA may be configured to use a combination of tokens, variable AIDs, and temporary identifiers instead of persistent MAC address for wireless communications between the AP and the STA to protect the privacy of the AP and the STA from other devices snooping the wireless traffic between the AP and the STA. The AP is also configured to use a combination of tokens, variable AIDs, and temporary identifiers to protect the privacy of the AP from attacking devices performing active scanning.

Figure 14:
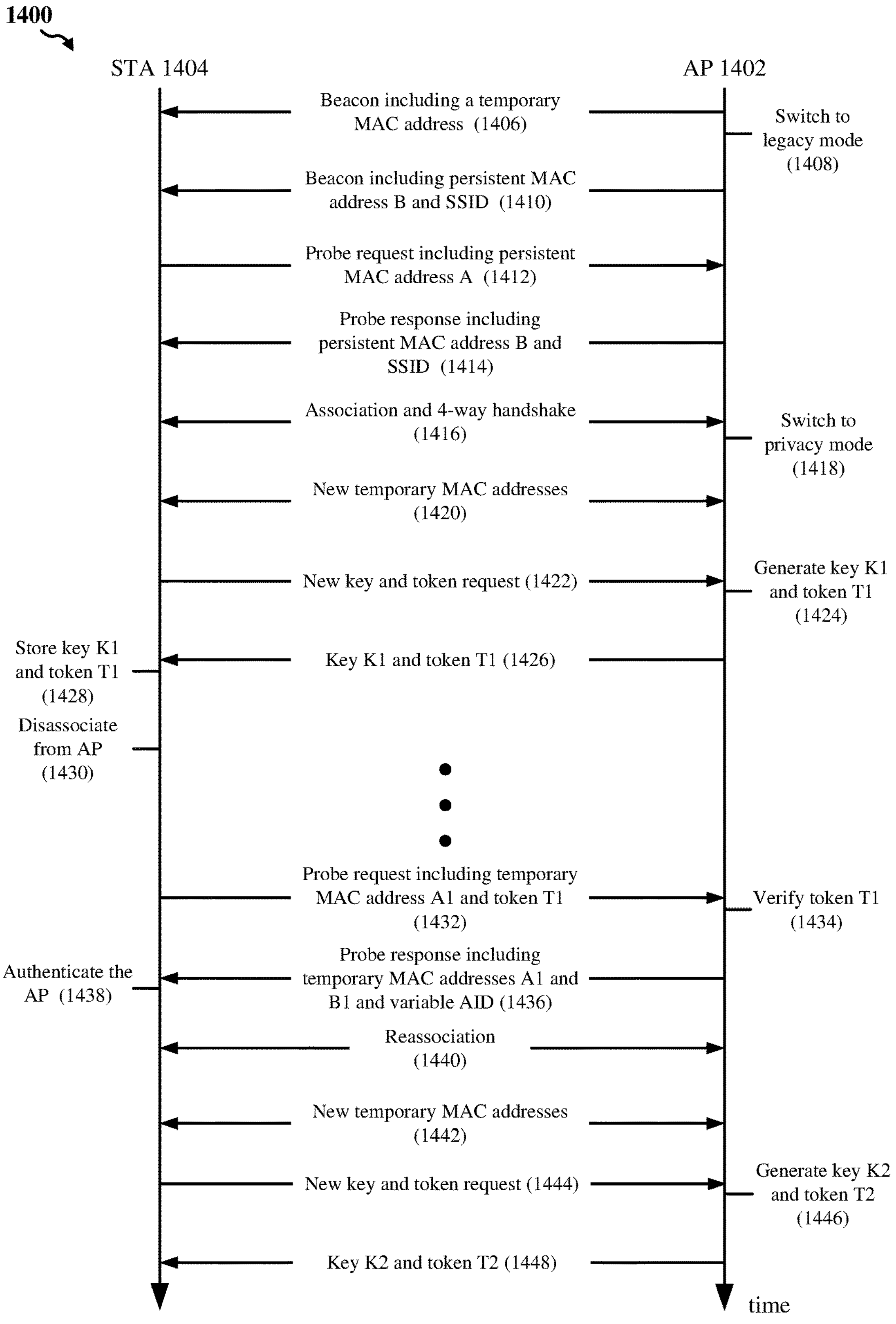
FIG. 14 shows a timing diagram illustrating an example interaction between a STA and an AP in a privacy mode.

FIG. 14 shows a timing diagram 1400 illustrating an example interaction between a STA 1404 and an AP 1402 in a privacy mode. The timing diagram 1400 depicts an example process of authentication, association, disassociation, and further association by the STA 1404 to an AP in a privacy mode to show example operations described herein that may be performed by the STA and the AP in the privacy mode. The STA 1404 may be the STAs 104 and 504 described herein with reference to FIGS. 1 and 5B, respectively, and the AP 1402 may be one of the APs 102 and 502 described herein with reference to FIGS. 1 and 5A, respectively. While the timing diagram depicts the STA 1404 associating with the same AP 1402 for clarity, the STA 1404 may associate with other APs of the service set if the service set is an ESS (such as when the STA moves through the coverage area of the ESS). In addition, while the STA 1404 is depicted as being connected to an AP 1402 in associating with the AP 1402 for clarity, the STA 1404 may be provisioned to associate with the AP 1402 or another AP of the service set (such as through DPP). The AP 1402 is depicted as switching between a legacy mode and a privacy mode and not a semi-private mode for clarity, but the AP 1402 may be configured to switch among any suitable modes for operation.

The STA 1404 has a persistent MAC address A and has never been associated with the service set. The AP 1402 has a persistent MAC address B and initially is operating in a privacy mode and configured to periodically transmit beacons. A temporary identifier for a persistent MAC address is referred to as a temporary MAC address (which may be a random value or other suitable value that appears to be a MAC address but is not associated with either the AP 1402 or the STA 1404).

At 1406, the AP 1402 in the privacy mode transmits a beacon including a temporary MAC address. In some implementations, the beacon also may include a variable AID. The STA 1404 receives the beacon, but since the STA 1404 has never been associated with the service set, the STA 1404 does not generate a probe request for the AP 1402 or attempt to associate with the AP 1402. For example, if the beacon includes a flag indicating that the AP 1402 is in a privacy mode, the STA 1404 may determine that the beacon is associated with an AP that is in a privacy mode (and thus the beacon does not include a persistent SSID). If the STA 1404 does generate and transmit a probe request, the AP 1402 may transmit a probe response including a variable AID that cannot be used to authenticate the AP 1402 (such as a random value or another suitable value that appears to be an SSID but is not associated with the AP 1402).

At 1408, the AP 1402 switches from the privacy mode to a legacy mode. For example, a user desiring to connect the STA 1404 to the AP 1402 physically may interact with the AP 1402 to cause the AP 1402 to switch to the legacy mode. With the AP 1402 in the legacy mode, the AP 1402 transmits a beacon at 1410 including the persistent MAC address B of the AP (such as for the BSSID) and including the SSID of the service set. While not shown, the AP 1402 may continue to transmit beacons at a defined beacon interval regardless of whether the AP 1402 is in a legacy mode or a privacy mode.

The STA 1404 is configured to perform active scanning. At 1412, the STA 1404 transmits a probe request including persistent MAC address A as a source address. As an alternative, the STA 1404 may send an association request to the AP 1402 based on the persistent MAC address B and the SSID from the beacon without performing active scanning. At 1414, the AP 1402 transmits a probe response including persistent MAC address B (such as for the BSSID) and the persistent SSID of the service set. At 1416, the STA 1404 and the AP 1402 associate with each other and perform a 4-way handshake. For example, the STA 1404 may transmit an association request to the AP 1402, the AP 1402 may transmit an association response, and the AP 1402 and STA 1404 may share an encryption key to encrypt communications between the AP 1402 and the STA 1404 while the STA 1404 remains connected to the AP 1402. After the 4-way handshake, communications between the STA 1404 and the AP 1402 are secure. While not shown, in some implementations, the STA 1404 may query the device user as to whether the STA 1404 is to connect to the AP 1402. For example, the STA 1404 may display the SSID on a display for the user to confirm whether the STA 1404 is to connect to the AP 1402. In this manner, the STA 1404 associating with the AP 1402 may be based on a user indicating to the STA 1404 that the STA 1404 is to connect to the AP 1402.

At 1418, the AP 1402 switches from the legacy mode to the privacy mode. For example, the AP 1402 stays in the legacy mode for a defined amount of time and then reverts back to the privacy mode. In another example, the AP 1402 switches to the privacy mode based on an indication from the user (such as the user pressing a button on the AP to cause the AP to switch to the privacy mode).

The STA 1404 is able to use tokens, variable AIDs, and temporary MAC addresses. At 1420, the STA 1404 and the AP 1402 share new temporary MAC addresses to be used for future wireless communications. For example, the AP 1402 may provide to the STA 1404 a new temporary MAC address B1 of the AP 1402, and the STA 1404 may provide to the AP 1402 a new temporary MAC address A1 of the STA 1404. Alternatively, the AP 1402 may determine and provide to the STA 1404 the new temporary MAC address A1. In some implementations, the AP 1402 and the STA 1404 may share a plurality of temporary MAC addresses, such as a first new temporary MAC address to be used now, a second new temporary MAC address to be used after the first new temporary MAC address, a third new temporary MAC address to be used after the second new temporary MAC address, and so on. The STA 1404 and the AP 1402 may switch to using the next new temporary MAC address based on a schedule, based on an indication provided by the AP 1402, or in any other suitable manner. For example, the AP 1402 may switch to using the next temporary MAC addresses without notifying the STA 1404. As a result, the STA 1404 may be unable to communicate with the AP 1402 using the previous temporary MAC addresses. For example, after transmitting to the AP 1402 using the previous temporary MAC addresses, the STA 1404 may listen for an acknowledgement (ACK) but not receive the ACK from the AP 1402. The STA 1404 may transmit an additional number of times to the AP 1402, and if the STA 1404 does not receive an ACK for each of the additional transmissions, the STA 1404 may switch to using the next temporary MAC addresses and attempt to transmit to the AP 1402 using the next temporary MAC addresses. The AP 1402 and the STA 1404 periodically may share new temporary MAC addresses as the previous temporary MAC addresses are cycled through.

As described herein, the AP 1402 may provide a new key and token to the STA 1404 after the 4-way handshake. The AP 1402 providing a new key and token to the STA 1404 may be based on the AP 1402 being solicited for the new key and token. At 1422, the STA 1404 requests the new key and token. The request may be in any suitable manner defined at the STA and the AP. At 1424, the AP 1402 generates new key K1 and new token T1. For example, the AP 1402 may generate the key K1 and the token T1 from the root key. The AP 1402 also may generate an expiry value E1 associated with the token T1. At 1426, the AP 1402 provides to the STA 1404 the new key K1 and the new token T1. For example, the AP 1402 may provide a tuple including the key K1, the token T1, and the expiry value E1.

At 1428, the STA 1404 stores the key K1 and the token T1. For example, the STA 1404 may store the tuple information in an element associated with the service set. The element may be a file, an object, or other computer-readable software that includes one or more tuples associated with the service set, one or more temporary MAC addresses associated with one or more APs of the service set, one or more persistent MAC addresses associated with the temporary MAC addresses, and the persistent SSID of the service set. While not shown, the AP 1402 and the STA 1404 may perform additional wireless communications with each other, such as passing data frames between the STA and the AP.

At 1430, the STA 1404 disassociates from the AP 1402. For example, the STA may move out of the coverage area of the AP 1402, the AP 1402 may be an SAP that is switched back to a STA mode (and thus no longer service the STA 1404), or the STA 1404 may be placed into an airplane mode or may be power off. At a later point in time, the STA 1404 may reassociate with the service set (such as reconnecting to the AP 1402). Since the STA 1404 was previously associated with the service set and received a key, a token, and a temporary MAC address, the STA 1404 may attempt to reassociate with the AP 1402 while the AP 1402 remains in the privacy mode (such as described herein).

When the STA 1404 is to reassociate with the service set, it is assumed that token T1 is not expired and the AP 1402 still is using the temporary MAC addresses A1 and B1 while remaining in the privacy mode. At 1432, the STA 1404 transmits a probe request including the temporary MAC address A1 and the token T1. The temporary MAC address A1 may be a source address in the probe request to indicate to the AP 1402 that the probe request is from the STA 1404. The probe request may be a broadcast such that a specific destination address is not needed in the probe request. The probe request also may include an AP challenge response if an AP challenge is received in a beacon or may include a challenge generated by the STA 1404. At 1434, the AP 1402 verifies the token T1. For example, the AP 1402 may generate key K1 from the token T1 using a root key, and the AP 1402 may use the key K1 to generate a variable AID. The AP 1402 also may generate a challenge response to the challenge from the STA, or the AP 1402 also may verify the AP challenge response to an AP challenge provided by the AP 1402 in a previous beacon.

At 1436, the AP 1402 transmits a probe response including the temporary MAC addresses A1 and B1 and the variable AID. As described herein, the variable AID may be a first variable AID if the AP 1402 is unable to verify the token, and the STA 1404 is unable to authenticate the AP 1402 using the first variable AID. The variable AID may be a second variable AID if the AP 1402 successfully verifies the token, and the STA 1404 is able to authenticate the AP 1402 using the second variable AID. The temporary MAC address A1 may be a destination address in the probe response to indicate to the STA 1404 that the probe response is directed to the STA 1404. The temporary MAC address B1 may be a source address in the probe response to indicate to the STA 1404 that the probe response originates from the AP 1402. In some implementations, the probe response may include one or more flags to indicate to the STA 1404 that the AP 1402 is in a privacy mode or to otherwise indicate that the AP is using an AID in place of an SSID.

At 1438, the STA 1404 authenticates the AP 1402. For example, the STA 1404 may generate the token T1 from the variable AID using the key K1 and determine that the stored token T1 matches the generated token T1. The STA 1404 also may determine whether a challenge response in a probe response is a valid answer to the challenge provided by the STA 1404 in the probe request. At 1440, the STA 1404 reassociates with the AP 1402. During the reassociation (such as an association request and an association response), the temporary MAC addresses A1 and B1 may be used in wireless communications between the STA 1404 and the AP 1402. The variable AID from probe response also may be used in the wireless communications during reassociation. The encryption keys shared during the previous 4-way handshake may be used to encrypt wireless communications between the AP 1402 and the STA 1404 after reassociation.

At 1442, the AP 1402 and the STA 1404 share new temporary MAC addresses. For example, the AP 1402 and the STA 1404 may share and confirm the current temporary MAC addresses A1 and B1 and share the new temporary MAC addresses A2 and B2 to be used after the temporary MAC addresses A1 and B1. In some implementations, a plurality of temporary MAC addresses to be cycled through over time may be shared between the AP 1402 and the STA 1404. At 1444, the STA 1404 requests a new key and token from the AP 1402. At 1446, the AP 1402 generates the new key K2 and the new token T2. At 1448, the AP 1402 provides the new key K2 and the new token T2 to the STA 1404 (such as in a tuple).

If the service set is an ESS, instead of reassociating with the same AP 1402, the STA 1404 may associate with a different AP of the ESS to reassociate with the ESS.

Figure 15:
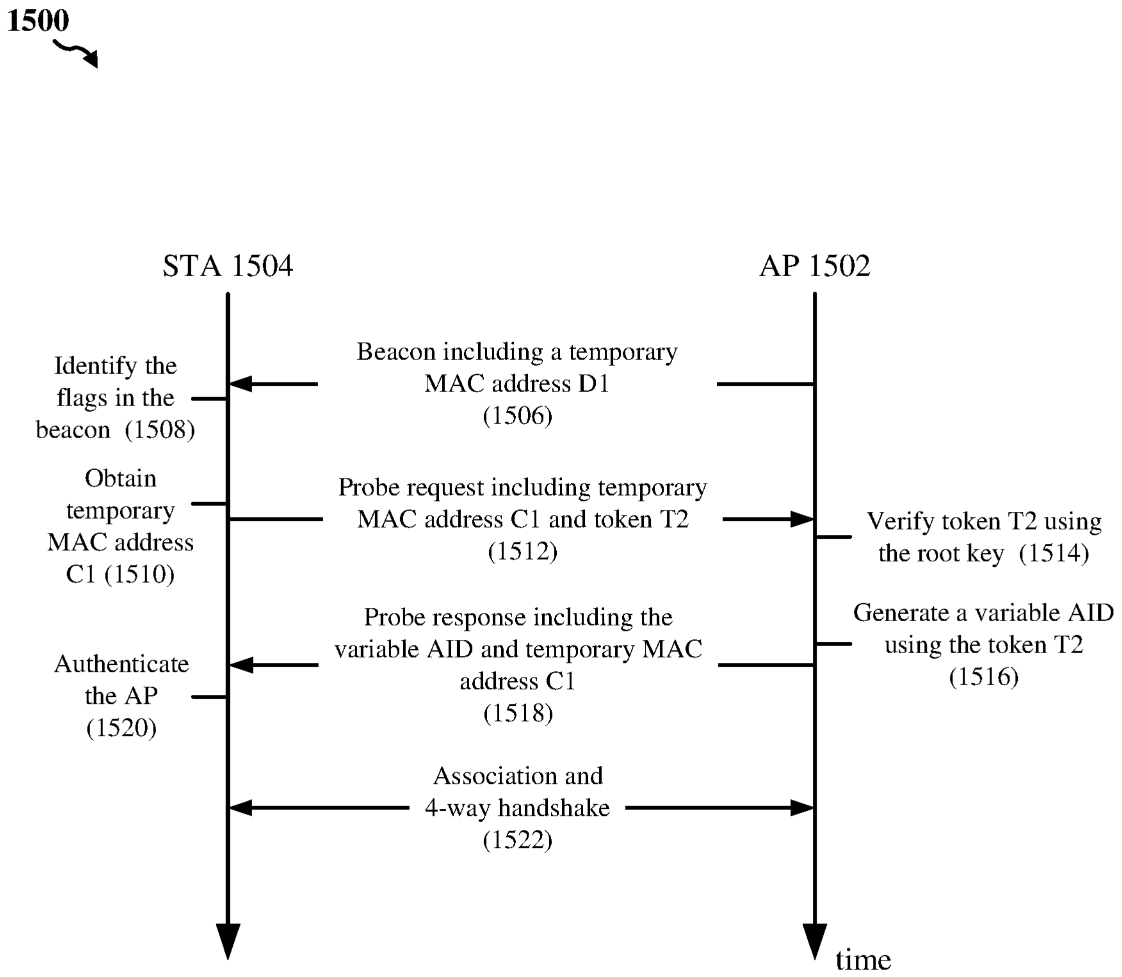
FIG. 15 shows a timing diagram illustrating an association by a STA with a different AP in a privacy mode of an extended service set.

FIG. 15 shows a timing diagram 1500 illustrating an association by the STA 1504 with a different AP 1502 in a privacy mode of an extended service set. The STA 1504 may be the same STA as STA 1404 depicted in the timing diagram 1400, the AP 1502 may be a different AP than AP 1402 depicted in the timing diagram 1400, and the AP 1402 and the AP 1502 may be associated with the same ESS (with a root key shared between the AP 1402 and the AP 1502). The STA 1504 may be the STAs 104 and 504 described herein with reference to FIGS. 1 and 5B, respectively, and the AP 1502 may be one of the APs 102 and 502 described herein with reference to FIGS. 1 and 5A, respectively. The timing diagram 1500 is based on the STA 1504 being the same STA as STA 1404 and having been previously associated with the AP 1402 before associating with the AP 1502. For example, the STA 1504 may move through a coverage area of the ESS such that the STA 1504 previously serviced by the AP 1402 is to be serviced by the AP 1502. The AP 1502 has a persistent MAC address D, is in a privacy mode, is configured to use a temporary MAC address D1, and is configured to transmit beacons periodically. The STA 1504 has stored the key K2 and the token T2 obtained from the AP 1402, which were generated using the root key shared between the AP 1402 and the AP 1502.

At 1506, the AP 1502 broadcasts a beacon including the temporary MAC address D1. For example, the temporary MAC address D1 is the BSSID in the beacon. In some implementations, the beacon also may include a variable AID. For example, the variable AID is the SSID in the beacon. As described herein, the variable AID in the beacon may be a random number or any other suitable number that cannot be used to identify the AP 1502. The beacon includes one or more flags or other indicators to indicate that the AP 1502 is in a privacy mode or otherwise that the beacon includes a variable AID and a temporary MAC address.

The STA 1504 is to connect to an AP (such as for internet access or access to other devices), and the STA 1504 is in the coverage area of the ESS to which the AP 1502 and the AP 1402 is associated. At 1508, the STA 1504 identifies the flags in the beacon obtained from the AP 1502 that indicates that the AP 1502 is in a privacy mode. As such, the STA 1504 may determine that the beacon does not include a persistent MAC address of the AP 1502 or a persistent SSID of the ESS.

With the beacon including a variable AID and a temporary MAC address, the STA 1504 may attempt to authenticate the AP 1502 as being associated with the ESS to which the STA 1504 previously was associated. At 1510, the STA 1504 obtains a temporary MAC address C1 to be included a probe request from the STA 1504. For example, the STA 1504 may generate a random number or otherwise generate a value to be used as the source address in the probe request.

At 1512, the STA 1504 broadcasts a probe request including the temporary MAC address C1 and the token T2. Since the token T2 is obtained from the AP 1402, the token T2 is associated with the ESS. In some implementations, the STA 1504 may have been associated with other APs in a privacy mode of other service sets. As such, the STA 1504 may have stored a plurality of tokens and keys. In some implementations, the probe request may include a plurality of tokens. In this manner, the STA 1504 may attempt to authenticate the AP 1502 to any one of the plurality of service sets associated with the plurality of tokens.

At 1514, the AP 1502 verifies the token T2 obtained from the probe request using the root key. At 1516, the AP 1502 generates a variable AID using the token T2. For example, the AP 1502 may generate the key K2 from the token T2 using the root key, and the AP 1502 may generate the variable AID from the key K2. If the STA 1504 also provides a challenge in the probe request, the variable AID also may be generated from the challenge (with the variable AID being the response to the challenge). While not shown, if verification of the token T2 fails, the AP 1502 generates a variable AID that cannot be used by the STA 1504 to authenticate the AP 1502. For example, the variable AID may be a random number that cannot be used by the STA 1504 to generate the key K2 to authenticate the AP 1502. In another example, if the key generated from the token T2 is incorrect, the variable AID generated from the key cannot be used by the STA 1504 to generate the key K2 to authenticate the AP 1502.

At 1518, the AP 1502 transmits a probe response including the variable AID and temporary MAC address C1. The temporary MAC address C1 is obtained from the probe request as the temporary MAC address for the STA 1504, and the temporary MAC address C1 is the destination address in the probe response. The temporary MAC address C1 in the probe response indicates to the STA 1504 that the probe response is intended for the STA 1504. The probe response also may include the temporary MAC address D1 as the source address. In some implementations, the SSID field of the probe response may include the variable AID. In some implementations, the SSID field of the probe response may include a random number or another value, and the variable AID may be included in a different portion of the probe response.

In some implementations, the probe response includes one or more flags or other indicators to indicate that the AP 1502 is in a privacy mode or otherwise that the probe response includes a variable AID and temporary MAC addresses instead of a persistent SSID and persistent MAC addresses. For example, if the variable AID is included in a portion of the probe response other than the SSID field, the SSID field may include a value to indicate that the probe response includes a variable AID and one or more temporary MAC addresses.

At 1520, the STA 1504 authenticates the AP 1502. For example, the STA 1504 generates the token T2 from the variable AID using the stored key K2. The STA 1504 may compare and identify whether the generated token matches the stored token. If the variable AID is a response to a challenge provided by the STA 1504 in the probe request, authenticating the AP 1502 also may include verifying that the variable AID is a valid answer to the challenge. At 1522, the STA 1504 and the AP 1502 associate with each other and perform a 4-way handshake. During the association and 4-way handshake, the STA 1504 and the AP 1502 may use the temporary MAC addresses C1 and D1 and the variable AID included in the probe response. While not shown in the timing diagram 1500, after the 4-way handshake, the STA 1504 and the AP 1502 may share new temporary MAC addresses, and the AP 1502 may provide a new token T3 and a new key K3 (and a new expiry value if used). In this manner, the STA 1504 may use the token T3 and the key K3 to reassociate with the ESS in the future.

As described herein (such as with reference to step 602 of FIG. 6, step 1202 of FIG. 12, step 1432 of FIG. 14, and step 1512 of FIG. 15) a STA may transmit a probe request including one or more tokens to an AP. In some implementations, the token is sent unencrypted or otherwise non-obfuscated in a suitable portion of a probe request. If the token is not used to authenticate the AP, the STA may use the token in a later probe request. In this manner, if the device stores a single token associated with a service set, the STA may repeat including the token over multiple probe requests. If the token is sent unencrypted or otherwise non-obfuscated in multiple probe requests, the token may be determined by snooping the probe requests and finding a repeating value in a portion of the probe request.

In some implementations, the STA may store and use a plurality of tokens associated with a service set. For example, when the STA is previously connected to an AP of the service set, the AP may provide a plurality of tokens to the STA (such as a plurality of tuples including a plurality of keys, as described herein, or a plurality of tokens associated with a single key). With the STA storing a plurality of tokens associated with the same service set, the STA may vary which token is to be included in a probe request. For example, the STA may progress in order through a list of tokens for successive probe requests. In a specific example, if the STA stores five unique tokens for a service set, the STA may progress through the five tokens to include a unique token in five successive probe requests to ensure that a single token is not repeated in multiple probe requests. In another example, the token from a plurality of tokens associated with the service set that is to be included in the probe request may be selected randomly by the STA. In this manner, the order of the tokens also does not repeat over successive probe requests.

In addition to, or to the alternative of, using multiple tokens associated with a same service set, the STA may encrypt or otherwise obfuscate a token before including the token in a probe request. In some implementations, the STA encrypts a token in a defined manner associated with a service set and includes the encrypted token in a probe request. For example, referring back to FIG. 14, before step 1432, the STA 1404 encrypts the token T1. In this manner, the probe request at 1432 includes the encrypted token, which is obtained by the AP 1402.

If an AP successfully decrypts the encrypted token, the AP includes a first variable AID in the probe response to be used by the STA in authenticating the AP. If the AP is unable to decrypt the encrypted token, the AP includes a second variable AID that prevents the STA from authenticating the AP. In this manner, being unable to decrypt the token may be treated as being unable to verify the token. As used herein, obtaining and verifying the token may include decrypting the token. The correct decryption mechanism defined for a service set may be known to all APs of the service set while being unknown to other devices (such as APs of other service sets).

Encryption and decryption of a token may be performed in any suitable manner. In some implementations, the Rivest-Shamir-Adleman (RSA) algorithm is used to generate keys for encryption and decryption (also referred to generally as RSA encryption). For RSA encryption, the STA encrypts the token using a public key, and the AP decrypts the token using a matching private key of a public key/private key pair. If an incorrect private key is used to attempt to decrypt the encrypted token by an AP, the AP is unable to decrypt the encrypted token. For example, a value other than the token is output as a result of decrypting the encrypted token using the incorrect private key. As a result, the value cannot be verified by the AP (since it is not the token), and the probe response includes a variable AID that cannot be used by the STA to authenticate the AP.

For public key/private key pairs, each public key is associated with a private key. In some implementations, each public key is associated with an AP authentication instance. For example, an AP or a management server of a service set may use the RSA algorithm to generate a plurality of public key/private key pairs for the service set. When a STA receives a token and a secret key (such as a tuple) when previously connected to an AP of a service set or through device provisioning, a public key of a pair also may be provided to the STA. In this manner, an AP (or provisioning device component) may provide a public key in addition to the tuple to the STA. The AP also may update that the private key associated with the public key is to be used to decrypt encrypted tokens. When the STA is to obtain a new token (such as obtaining token T2 in step 1442 of FIG. 14), the STA also may obtain a new public key. The AP providing the new public key also may update to using a new private key associated with the new public key to decrypt the encrypted token.

In some other implementations, the same public key may be used over time. For example, over multiple instances of AP authentication for a service set, the STA may encrypt each different token for the service set using the same public key. In this manner, the same private key may be used by an AP of the service set to decrypt each encrypted token. The public key may be obtained during an initial provisioning to the service set or the first time that the STA associates with the service set. In some other implementations, the public key may be obtained from a user, a device manufacturer, may be downloaded from the internet, or may be obtained in any other suitable manner. As noted, the public key may remain the same or may change at any suitable time. For example, the public key may be changed weekly or monthly. In some implementations, if a public key to be used is updated without being provided to a STA, a legacy mode is used in providing the updated public key to the STA. In some implementations, a public key may be unique to a STA. In this manner, an AP may store a plurality of private keys associated with the public keys for a plurality of STAs. In some other implementations, a same public key may be used by multiple STAs.

An AP may obtain a private key in any suitable manner. For example, the private key may be provided by a management server, the private key may be provided by a user, the private key may be provided by a device manufacturer, and so on. In one example, an AP may use the RSA algorithm to generate a public key/private key pair. In another example, the AP may have stored a previously generated public key/private key pair to be used for token encryption and decryption. If the service set is an ESS, the private key may be shared among the plurality of APs of the ESS. The private key may be shared in a similar manner as sharing the root key (as described herein). In this manner, a private key may be associated with a specific service set. In some implementations of sharing the private key, only the private key (and not the public key) is shared among the APs. In some other implementations, the entirety of the public key/private key pair is shared among the APs. Generation and sharing of the public key or the private key may be performed in any suitable manner and is not limited to any specific example herein. For example, while the RSA algorithm is described as being used in generating a public key/private key pair, a public key/private key pair may be generated in any other suitable manner (such as using another suitable algorithm) or any other suitable manner of asymmetric encryption may be used to encrypt and decrypt a token.

In some implementations, each time a STA is to send a token in a probe request, the STA may encrypt the token (such as using a public key). Some encryption operations may require significant time and processing resources. To reduce the amount of time and processing resources used by a STA for encryption, the STA may not perform the encryption operation each time the STA is to send a token in a probe request.

In some implementations, the STA may encrypt a token to generate an encrypted token, and the STA may store the encrypted token. The STA then may use the same encrypted token for multiple probe requests or over a period of time. Encryption of a token may occur when the STA has available processing resources for encryption. For example, the STA may encrypt the token each hour (or another suitable time interval) when able and use the same encrypted token for the hour. In some implementations, the STA may encrypt a token a plurality of times to generate a plurality of encrypted tokens, and the STA may store the plurality of encrypted tokens for use in the future. For example, after the STA receives a new token, the STA may encrypt the new token a defined number of times using the public key to generate a defined number of encrypted tokens that are stored at the STA. As such, the STA may select one of the defined number of encrypted tokens to be included in a probe request. The STA may use any suitable mechanism in selecting which encrypted token is to be included in a probe request. For example, the encrypted token may be randomly selected. In another example, the STA may progress through an order of encrypted tokens for successive probe requests. In this manner, an encrypted token may be used for each probe request but an encryption operation of the token is not required for each probe request.

As described herein, an AP may decrypt an encrypted token (such as using a private key) obtained in a probe request from a STA. In some implementations, the AP is configured to attempt to decrypt each obtained encrypted token. In some instances, though, the AP may lack sufficient processing resources or otherwise may be unable to decrypt every encrypted token. For example, a smartphone acting as an SAP may have limited processing resources to perform decryption. In some implementations, an AP may limit a rate at which the AP decrypts encrypted tokens. For example, the AP may be configured to limit decryption to one encrypted token in a defined amount of time. If one or more other encrypted tokens are obtained during the same amount of time, the AP may prevent decrypting the one or more other encrypted tokens. The rate at which the AP decrypts encrypted tokens may be any suitable rate. For example, an AP may adjust the rate based on available processing resources at the AP. In another example, the rate may be predefined by a device manufacturer or a user.

In some implementations, if the AP limits the rate of decryption, the AP may be configured to treat encrypted tokens that are not decrypted as not being verified. In this manner, the AP may provide a probe response including a variable AID that cannot be used the authenticate the AP. In some implementations, if an AP does not attempt to decrypt an encrypted token as a result of limiting the rate of decryption, the AP may provide a probe response including a flag or other indicator indicating that the AP did not attempt to decrypt the encrypted token. For example, a flag may indicate that the AP is temporarily busy and unable to process the probe request. In some other implementations, the AP may be configured to prevent sending a probe response for probe requests whose encrypted tokens are not decrypted.

If a STA is configured to periodically transmit probe requests including an encrypted token, even if an AP is configured to limit the rate at which encrypted tokens are to be decrypted, over time, one of the probe requests transmitted by the STA will be processed by the AP such that the included encrypted token is decrypted. As such, while the amount of time used to authenticate an AP may be extended, the STA still is able to authenticate the AP.

As described herein, a variable AID for a persistent SSID in addition to temporary identifiers for persistent MAC addresses may be used to protect an AP's (and a STA's) privacy. To note, the operations described herein from the AP perspective are described as being performed by the AP for clarity in explaining aspects of the present disclosure. In some implementations, one or more operations may be performed by another device of the service set. For example, a private backhaul between the AP and a management server may be used for the AP to provide information obtained from the STA (such as the token, the challenge, or the AP challenge response) to the management server. In this manner, the management server (or another device of the service set) may be configured to perform one or more of the operations described herein, with the AP acting as a facilitator to pass information between the STA and the management server.

Implementation examples are described in the following numbered clauses:

1. A wireless communication device, including:

a processing system; and an interface configured to:

obtain a probe request from a station (STA), the probe request including a token; and provide a probe response, the probe response including a variable authentication identifier (AID) associated with authenticating the wireless communication device as belonging to a service set, where the variable AID is associated with the token.

2. The wireless communication device of clause 1, where:

the probe request includes a plurality of tokens including the token.

3. The wireless communication device of one or more of clauses 1-2, where:

the token is provided to the STA by one of one or more access points (APs) of the service set during a previous association of the STA to the service set.

4. The wireless communication device of one or more of clauses 1-3, where:

the STA is previously associated with the service set; and the variable AID is associated with a key.

5. The wireless communication device of one or more of clauses 1-4, where:

the key is provided to the STA by one of one or more access points (APs) of the service set during a previous association of the STA to the service set.

6. The wireless communication device of one or more of clauses 1-5, where the processing system is configured to:

obtain the variable AID using the key.

7. The wireless communication device of one or more of clauses 1-6, where the processing system is configured to:

obtain the key from the token.

8. The wireless communication device of one or more of clauses 1-7, where the processing system is configured to:

verify the token.

9. The wireless communication device of one or more of clauses 1-8, where the processing system is configured to:

obtain, from the token, an expiry value associated with the token.

10. The wireless communication device of one or more of clauses 1-9, where:

verifying the token includes verifying whether the token is still valid using the expiry value.

11. The wireless communication device of one or more of clauses 1-10, where:

the token and the key are associated with a root key.

12. The wireless communication device of one or more of clauses 1-11, where:

verifying the token includes verifying the token using the root key; and the root key is available to one or more access points (APs) of the service set.

13. The wireless communication device of one or more of clauses 1-12, where the processing system is configured to:

obtain the key from the token using the root key.

14. The wireless communication device of one or more of clauses 1-13, where:

the variable AID includes one of:

a first variable AID if the token verification fails, where the first variable AID is associated with preventing authentication of the wireless communication device; or a second variable AID if the token verification succeeds, where the second variable AID is associated with authenticating the wireless communication device.

15. The wireless communication device of one or more of clauses 1-14, where:

the probe request includes a challenge from the STA; and the variable AID including the second variable AID is associated with the challenge.

16. The wireless communication device of one or more of clauses 1-15, where the interface is configured to:

provide one or more new tokens to the STA after providing the second variable AID, the one or more new tokens associated with future authentication of an AP as belonging to the service set.

17. The wireless communication device of one or more of clauses 1-16, where the interface is configured to:

provide one or more new keys to the STA, the one or more new keys associated with the one or more new tokens.

18. The wireless communication device of one or more of clauses 1-17, where the interface is configured to:

provide one or more new expiry values to the STA, the one or more new expiry values associated with an expiration time of the one or more new tokens.

19. The wireless communication device of one or more of clauses 1-18, where:

the variable AID is associated with a time when generating the variable AID.

20. The wireless communication device of one or more of clauses 1-19, where:

the interface is configured to:

provide one or more beacons prior to obtaining the probe request, the one or more beacons including an AP challenge and the probe request including an AP challenge response; and the processing system is configured to:

verify the AP challenge response using the AP challenge.

21. The wireless communication device of one or more of clauses 1-20, where the processing system is configured to:

obtain the AP challenge before providing the one or more beacons by the wireless communication device, the AP challenge being randomly generated.

22. The wireless communication device of one or more of clauses 1-21, where the processing system is configured to:

periodically obtain the AP challenge, the AP challenge differing between instances of obtaining the AP challenge.

23. The wireless communication device of one or more of clauses 1-22, where:

the probe response includes the AP challenge.

24. The wireless communication device of one or more of clauses 1-23, where:

the probe response includes an identifier of the AP challenge in the one or more beacons.

25. The wireless communication device of one or more of clauses 1-24, where:

the probe request includes a challenge from the STA; and verifying the AP challenge response includes verifying the AP challenge response using the challenge.

26. The wireless communication device of one or more of clauses 1-25, where:

the one or more beacons include the one or more beacons most recently provided by the wireless communication device before obtaining the probe request.

27. The wireless communication device of one or more of clauses 1-26, where:
the token is encrypted;
the processing system is configured to decrypt the token; and
the variable AID is associated with decrypting the token.
28. The wireless communication device of one or more of clauses 1-27, where:
the token is encrypted using a public key of a public key/private key pair; and
decrypting the token includes decrypting the token using a private key of the public key/private key pair.
29. A method performed by an apparatus of a wireless communication device, including:
receiving a probe request from a station (STA), the probe request including a token; and
transmitting a probe response, the probe response including a variable authentication identifier (AID) associated with authenticating the wireless communication device as belonging to a service set, where the variable AID is associated with the token.
30. The method of clause 29, where:
the probe request includes a plurality of tokens including the token.
31. The method of one or more of clauses 29-30, where:
the token is provided to the STA by one of one or more access points (APs) of the service set during a previous association of the STA to the service set.
32. The method of one or more of clauses 29-31, where:
the STA is previously associated with the service set; and
the variable AID is associated with a key.
33. The method of one or more of clauses 29-32, where:
the key is provided to the STA by one of one or more access points (APs) of the service set during a previous association of the STA to the service set.
34. The method of one or more of clauses 29-33, further including:
obtaining the variable AID using the key.
35. The method of one or more of clauses 29-34, further including:
obtaining the key from the token.
36. The method of one or more of clauses 29-35, further including:
verifying the token.
37. The method of one or more of clauses 29-36, further including:
obtaining, from the token, an expiry value associated with the token.
38. The method of one or more of clauses 29-37, where:
verifying the token includes verifying whether the token is still valid using the expiry value.
39. The method of one or more of clauses 29-38, where:
the token and the key are associated with a root key.
40. The method of one or more of clauses 29-39, where:
verifying the token includes verifying the token using the root key; and
the root key is available to one or more access points (APs) of the service set.
41. The method of one or more of clauses 29-40, further including:
obtaining the key from the token using the root key.
42. The method of one or more of clauses 29-41, where:
the variable AID includes one of:
a first variable AID if the token verification fails, where the first variable AID is associated with preventing authentication of the wireless communication device; or
a second variable AID if the token verification succeeds, where the second variable AID is associated with authenticating the wireless communication device.
43. The method of one or more of clauses 29-42, where:
the probe request includes a challenge from the STA; and
the variable AID including the second variable AID is associated with the challenge.
44. The method of one or more of clauses 29-43, further including:
transmitting one or more new tokens to the STA after providing the second variable AID, the one or more new tokens associated with future authentication of an AP as belonging to the service set.
45. The method of one or more of clauses 29-44, further including:
transmitting one or more new keys to the STA, the one or more new keys associated with the one or more new tokens.
46. The method of one or more of clauses 29-45, further including:
transmitting one or more new expiry values to the STA, the one or more new expiry values associated with an expiration time of the one or more new tokens.
47. The method of one or more of clauses 29-46, where:
the variable AID is associated with a time when generating the variable AID.
48. The method of one or more of clauses 29-47, further including:
transmitting one or more beacons prior to receiving the probe request, the one or more beacons including an AP challenge and the probe request including an AP challenge response; and
verifying the AP challenge response using the AP challenge.
49. The method of one or more of clauses 29-48, further including:
obtaining the AP challenge before transmitting the one or more beacons, the AP challenge being randomly generated.
50. The method of one or more of clauses 29-49, further including:
periodically obtaining the AP challenge, the AP challenge differing between instances of obtaining the AP challenge.
51. The method of one or more of clauses 29-50, where:
the probe response includes the AP challenge.
52. The method of one or more of clauses 29-51, where:
the probe response includes an identifier of the AP challenge in the one or more beacons.
53. The method of one or more of clauses 29-52, where:
the probe request includes a challenge from the STA; and
verifying the AP challenge response includes verifying the AP challenge response using the challenge.
54. The method of one or more of clauses 29-53, where:
the one or more beacons include the one or more beacons most recently transmitted by the wireless communication device before receiving the probe request.
55. The method of one or more of clauses 29-54, further including:
decrypting the token, where:
the token is encrypted; and
the variable AID is associated with decrypting the token.
56. The method of one or more of clauses 29-55, where:
the token is encrypted using a public key of a public key/private key pair; and decrypting the token includes decrypting the token using a private key of the public key/private key pair.

57. A wireless communication device, including:

a processing system; and an interface configured to:

provide a probe request to an access point (AP), the probe request including a token, where the token is associated with a service set; and obtain a probe response from the AP, the probe response including a variable authentication identifier (AID) associated with authenticating the AP as belonging to the service set, where the variable AID is associated with the token.

58. The wireless communication device of clause 57, where:

the probe request includes a plurality of tokens including the token; and each token is associated with a different service set.

59. The wireless communication device of one or more of clauses 57-58, where the interface is configured to:

obtain the token from one of one or more APs of the service set during a previous association of the wireless communication device to the service set.

60. The wireless communication device of one or more of clauses 57-59, where:

the wireless communication device is previously associated with the service set; and providing the token is associated with an expiry value.

61. The wireless communication device of one or more of clauses 57-60, where the interface is configured to:

obtain the expiry value from one of one or more APs of the service set during the previous association of the wireless communication device to the service set.

62. The wireless communication device of one or more of clauses 57-61, where the processing system is configured to:

verify the variable AID.

63. The wireless communication device of one or more of clauses 57-62, where:

the wireless communication device is previously associated with the service set; and the variable AID is associated with a key.

64. The wireless communication device of one or more of clauses 57-63, where the interface is configured to:

obtain the key from one of one or more APs of the service set during the previous association of the wireless communication device to the service set.

65. The wireless communication device of one or more of clauses 57-64, where the processing system is configured to:

obtain, from the variable AID, the token using the key.

66. The wireless communication device of one or more of clauses 57-65, where:

verifying the variable AID includes verifying the token obtained from the variable AID using the key.

67. The wireless communication device of one or more of clauses 57-66, where:

the variable AID includes one of:

a first variable AID to prevent authentication of the AP; or a second variable AID to authenticate the AP.

68. The wireless communication device of one or more of clauses 57-67, where:

the probe request includes a challenge from the wireless communication device; and the variable AID including one of the first variable AID or the second variable AID is associated with the challenge.

69. The wireless communication device of one or more of clauses 57-68, where the interface is configured to:

obtain one or more new tokens, the one or more new tokens associated with future authentication of one or more APs as belonging to the service set.

70. The wireless communication device of one or more of clauses 57-69, where:

the one or more new tokens are obtained during provisioning of the wireless communication device for use of the service set.

71. The wireless communication device of one or more of clauses 57-70, where the interface is configured to:

obtain one or more new keys, the one or more new keys associated with the one or more new tokens.

72. The wireless communication device of one or more of clauses 57-71, where:

the one or more new keys are obtained during provisioning of the wireless communication device for use of the service set.

73. The wireless communication device of one or more of clauses 57-72, where the interface is configured to:

obtain one or more new expiry values, the one or more new expiry values associated with an expiration time of the one or more new tokens.

74. The wireless communication device of one or more of clauses 57-73, where:

the one or more new expiry values are obtained during provisioning of the wireless communication device for use of the service set.

75. The wireless communication device of one or more of clauses 57-74, where the processing system is configured to:

after successfully verifying the variable AID, initiate a connection of the wireless communication device to the service set.

76. The wireless communication device of one or more of clauses 57-75, where:

the variable AID is associated with a time when the variable AID is generated by the AP.

77. The wireless communication device of one or more of clauses 57-76, where:

the interface is configured to:

obtain one or more beacons from the AP prior to providing the probe request, the one or more beacons including an AP challenge; and the processing system is configured to:

obtain an AP challenge response from the AP challenge, the probe request including the AP challenge response.

78. The wireless communication device of one or more of clauses 57-77, where:

the probe response includes the AP challenge.

79. The wireless communication device of one or more of clauses 57-78, where:

the probe response includes an identifier of the AP challenge in the one or more beacons.

80. The wireless communication device of one or more of clauses 57-79, where:

the probe request includes a challenge; and the AP challenge response is associated with the challenge.

81. The wireless communication device of one or more of clauses 57-80, where:

the one or more beacons include the one or more beacons most recently transmitted by the AP before transmitting the probe request.

82. The wireless communication device of one or more of clauses 57-81, where the processing system is configured to:

encrypt the token, where:

the token included in the probe request is encrypted; and the variable AID is associated with decrypting the token.

83. The wireless communication device of one or more of clauses 57-82, where:

encrypting the token includes encrypting the token using a public key of a public key/private key pair; and the variable AID is associated with decrypting the token using a private key of the public key/private key pair.

84. A method performed by an apparatus of a wireless communication device, including:

transmitting a probe request to an access point (AP), the probe request including a token, where the token is associated with a service set; and receiving a probe response from the AP, the probe response including a variable authentication identifier (AID) associated with authenticating the AP as belonging to the service set, where the variable AID is associated with the token.

85. The method of clause 84, where:

the probe request includes a plurality of tokens including the token; and each token is associated with a different service set.

86. The method of one or more of clauses 84-85, further including:

receiving the token from one of one or more APs of the service set during a previous association of the wireless communication device to the service set.

87. The method of one or more of clauses 84-86, where:

the wireless communication device is previously associated with the service set; and transmitting the token is associated with an expiry value.

88. The method of one or more of clauses 84-87, further including:

receiving the expiry value from one of one or more APs of the service set during the previous association of the wireless communication device to the service set.

89. The method of one or more of clauses 84-88, further including:

verifying the variable AID.

90. The method of one or more of clauses 84-89, where:

the wireless communication device is previously associated with the service set; and the variable AID is associated with a key.

91. The method of one or more of clauses 84-90, further including:

receiving the key from one of one or more APs of the service set during the previous association of the wireless communication device to the service set.

92. The method of one or more of clauses 84-91, further including:

obtaining, from the variable AID, the token using the key.

93. The method of one or more of clauses 84-92, where:

verifying the variable AID includes verifying the token obtained from the variable AID using the key.

94. The method of one or more of clauses 84-93, where:

the variable AID includes one of:

a first variable AID to prevent authentication of the AP; or a second variable AID to authenticate the AP.

95. The method of one or more of clauses 84-94, where:

the probe request includes a challenge from the wireless communication device; and the variable AID including one of the first variable AID or the second variable AID is associated with the challenge.

96. The method of one or more of clauses 84-95, further including:

receiving one or more new tokens from the AP, the one or more new tokens associated with future authentication of or more APs as belonging to the service set.

97. The method of one or more of clauses 84-96, where:

the one or more new tokens are received during provisioning of the wireless communication device for use of the service set.

98. The method of one or more of clauses 84-97, further including:

receiving one or more new keys from the AP, the one or more new keys associated with the one or more new tokens.

99. The method of one or more of clauses 84-98, where:

the one or more new keys are received during provisioning of the wireless communication device for use of the service set.

100. The method of one or more of clauses 84-99, further including:

receiving one or more new expiry values from the AP, the one or more new expiry values associated with an expiration time of the one or more new tokens.

101. The method of one or more of clauses 84-100, where:

the one or more new expiry values are received during provisioning of the wireless communication device for use of the service set.

102. The method of one or more of clauses 84-101, further including:

after successfully verifying the variable AID, initiating a connection of the wireless communication device to the service set.

103. The method of one or more of clauses 84-102, where:

the variable AID is associated with a time when the variable AID is generated by the AP.

104. The method of one or more of clauses 84-103, further including:

receiving one or more beacons from the AP prior to transmitting the probe request, the one or more beacons including an AP challenge; and obtaining an AP challenge response from the AP challenge, the probe request including the AP challenge response.

105. The method of one or more of clauses 84-104, where:

the probe response includes the AP challenge.

106. The method of one or more of clauses 84-105, where:

the probe response includes an identifier of the AP challenge in the one or more beacons.

107. The method of one or more of clauses 84-106, where:

the probe request includes a challenge; and the AP challenge response is associated with the challenge.

108. The method of one or more of clauses 84-107, where:

the one or more beacons include the one or more beacons most recently transmitted by the AP before transmitting the probe request.

109. The method of one or more of clauses 84-108, further including:

encrypting the token, where:

the token included in the probe request is encrypted; and the variable AID is associated with decrypting the token.

110. The method of one or more of clauses 84-109, where:

encrypting the token includes encrypting the token using a public key of a public key/private key pair; and the variable AID is associated with decrypting the token using a private key of the public key/private key pair.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. For example, referring to process 900, while step 904 is depicted as being performed before step 906, step 906 may be performed before step 904 or both steps may be performed concurrently. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. An access point (AP) of a service set, comprising:

a processing system that includes one or more processors and one or more memories coupled with the one or more processors, the processing system configured to cause the AP to:

provide, in a legacy mode of the AP, a persistent medium access control (MAC) address and a persistent service set identifier (SSID) to a station (STA);

switch from the legacy mode to a privacy mode;

obtain, in the privacy mode, a probe request from the STA, the probe request including a token corresponding to the service set associated with the AP and the STA;

obtain, in the privacy mode, a variable authentication identifier (AID) using a key associated with the token, the variable AID associated with authenticating the AP as belonging to the service set, wherein the variable AID is different from the persistent SSID associated with the service set, and wherein the variable AID varies over time; and provide a probe response, the probe response including the variable AID in accordance with authenticating the AP as belonging to the service set, wherein the variable AID is associated with the token and is included in a frame body of the probe response that is separate from a frame check sequence (FCS) of the probe response, and the token and the variable AID are both obtained using the key.

2. The AP of claim 1, wherein:

the STA is previously associated with the service set; and the variable AID is associated with the key.

3. The AP of claim 2, wherein the processing system is configured to cause the AP to:

generate the variable AID using the key.

4. The AP of claim 2, wherein the processing system is configured to cause the AP to:

obtain the key from the token; and verify the token.

5. The AP of claim 4, wherein the processing system is configured to cause the AP to:

obtain, from the token, an expiry value associated with the token, wherein verifying the token includes verifying whether the token is still valid using the expiry value.

6. The AP of claim 4, wherein:

the token and the key are associated with a root key;

verifying the token includes verifying the token using the root key; and the root key is available to one or more access points (APs) of the service set.

7. The AP of claim 6, wherein the processing system is configured to cause the AP to:

obtain the key from the token using the root key.

8. The AP of claim 4, wherein:

the variable AID includes one of:

a first variable AID if token verification fails, wherein the first variable AID is associated with preventing authentication of the AP; or a second variable AID if the token verification succeeds, wherein the second variable AID is associated with authenticating the AP.

9. A method performed by an apparatus of an access point (AP) of a service set, comprising:

providing, in a legacy mode of the AP, a persistent medium access control (MAC) address and a persistent service set identifier (SSID) to a station (STA);

switching from the legacy mode to a privacy mode;

receiving, in the privacy mode, a probe request from the STA, the probe request including a token corresponding to the service set associated with the AP and the STA;

obtaining, in the privacy mode, a variable authentication identifier (AID) using a key associated with the token, the variable AID associated with authenticating the AP as belonging to the service set, wherein the variable AID is different from the persistent SSID associated with the service set, and wherein the variable AID varies over time; and transmitting a probe response, the probe response including the variable AID in accordance with authenticating the AP as belonging to the service set, wherein the variable AID is associated with the token and is included in a frame body of the probe response that is separate from a frame check sequence (FCS) of the probe response, and the token and the variable AID are both obtained using the key.

10. The method of claim 9, wherein:

the STA is previously associated with the service set; and the variable AID is associated with the key.

11. The method of claim 10, further comprising:

generating the variable AID using the key.

12. The method of claim 10, further comprising:

obtaining the key from the token; and verifying the token.

13. The method of claim 12, further comprising:

obtaining, from the token, an expiry value associated with the token, wherein verifying the token includes verifying whether the token is still valid using the expiry value.

14. The method of claim 12, wherein:

the token and the key are associated with a root key;

verifying the token includes verifying the token using the root key; and the root key is available to one or more access points (APs) of the service set.

15. The method of claim 14, further comprising:

obtaining the key from the token using the root key.

16. The method of claim 12, wherein:

the variable AID includes one of:

a first variable AID if token verification fails, wherein the first variable AID is associated with preventing authentication of the AP; or a second variable AID if the token verification succeeds, wherein the second variable AID is associated with authenticating the AP.

17. A station (STA) of a service set, comprising:

a processing system that includes one or more processors and one or more memories coupled with the one or more processors, the processing system configured to cause the STA to:

obtain, from an access point (AP) in a legacy mode, a persistent medium access control (MAC) address and a persistent service set identifier (SSID);

provide, in accordance with a switch from the legacy mode to a privacy mode, a probe request to the AP, the probe request including a token, wherein the token corresponds to the service set associated with the STA and the AP;

obtain a probe response from the AP in the privacy mode, the probe response including a variable authentication identifier (AID) in accordance with authenticating the AP as belonging to the service set, wherein the variable AID is associated with the token, and is different from a the persistent SSID associated with the service set, wherein the variable AID varies over time and is included in a frame body of the probe response that is separate from a frame check sequence (FCS) of the probe response, and the token and the variable AID are both obtained using a key; and obtain, from the variable AID, the token using the key associated with the token, the variable AID associated with authenticating the STA as belonging to the service set.

18. The STA of claim 17, wherein:

the STA is previously associated with the service set; and providing the token is associated with an expiry value.

19. The STA of claim 17, wherein the processing system is configured to cause the STA to:

verify the variable AID, wherein:

the STA is previously associated with the service set; and the variable AID is associated with the key.

20. The STA of claim 19, wherein:

verifying the variable AID includes verifying the token obtained from the variable AID using the key.

21. The STA of claim 19, wherein:

the variable AID includes one of:

a first variable AID to prevent authentication of the AP; or a second variable AID to authenticate the AP.

22. The STA of claim 21, wherein:

the probe request includes a challenge from the STA; and the variable AID including one of the first variable AID or the second variable AID is associated with the challenge.

23. The STA of claim 19, wherein the processing system is configured to cause the STA to:

after successfully verifying the variable AID, initiate a connection of the STA to the service set.

24. A method performed by an apparatus of a station (STA) of a service set, comprising:

obtaining, from an access point (AP) in a legacy mode, a persistent medium access control (MAC) address and a persistent service set identifier (SSID);

transmitting, in accordance with a switch from the legacy mode to a privacy mode, a probe request to the AP, the probe request including a token, wherein the token corresponds to the service set associated with the STA and the AP;

receiving a probe response from the AP in the privacy mode, the probe response including a variable authentication identifier (AID) in accordance with authenticating the AP as belonging to the service set, wherein the variable AID is associated with the token and is different from a the persistent SSID associated with the service set, wherein the variable AID varies over time and is included in a frame body of the probe response that is separate from a frame check sequence (FCS) of the probe response, and the token and the variable AID are both obtained using a key; and obtaining, from the variable AID, the token using the key associated with the token, the variable AID associated with authenticating the STA as belonging to the service set.

25. The method of claim 24, wherein:

the STA is previously associated with the service set; and transmitting the token is associated with an expiry value.

26. The method of claim 24, further comprising:

verifying the variable AID, wherein:

the STA is previously associated with the service set; and the variable AID is associated with the key.

27. The method of claim 26, wherein verifying the variable AID includes verifying the token obtained from the variable AID using the key.

28. The method of claim 26, wherein:

the variable AID includes one of:

a first variable AID to prevent authentication of the AP; or a second variable AID to authenticate the AP.

29. The method of claim 28, wherein:

the probe request includes a challenge from the STA; and the variable AID including one of the first variable AID or the second variable AID is associated with the challenge.

30. The method of claim 26, further comprising:

after successfully verifying the variable AID, initiating a connection of the STA to the service set.

* * * * *